United States Patent
Hausman, Jr.

(10) Patent No.: US 11,696,379 B2
(45) Date of Patent: Jul. 4, 2023

(54) METHOD AND APPARATUS FOR DETERMINING A TARGET LIGHT INTENSITY FROM A PHASE-CONTROL SIGNAL

(71) Applicant: Lutron Technology Company LLC, Coopersburg, PA (US)

(72) Inventor: Donald F. Hausman, Jr., New Tripoli, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

(21) Appl. No.: 17/973,995

(22) Filed: Oct. 26, 2022

(65) Prior Publication Data

US 2023/0038540 A1 Feb. 9, 2023

Related U.S. Application Data

(60) Continuation of application No. 17/066,649, filed on Oct. 9, 2020, now Pat. No. 11,490,475, which is a
(Continued)

(51) Int. Cl.
| | |
|---|---|
| H05B 45/10 | (2020.01) |
| H05B 41/392 | (2006.01) |
| H05B 41/295 | (2006.01) |
| H05B 41/282 | (2006.01) |
| H05B 45/39 | (2020.01) |
| H02M 1/08 | (2006.01) |

(52) U.S. Cl.
CPC .............. *H05B 45/10* (2020.01); *H02M 1/08* (2013.01); *H05B 41/2828* (2013.01); *H05B 41/295* (2013.01); *H05B 41/3924* (2013.01); *H05B 41/3925* (2013.01); *H05B 45/39* (2020.01); *Y02B 20/00* (2013.01)

(58) Field of Classification Search
CPC ... H02M 1/08; H05B 41/2828; H05B 41/295; H05B 41/3924; H05B 41/3925; H05B 45/10; H05B 45/39; Y02B 20/00; Y02B 20/30
See application file for complete search history.

(56) References Cited

U.S. PATENT DOCUMENTS

| | | | |
|---|---|---|---|
| 4,797,599 A | 1/1989 | Ference et al. | |
| 5,021,716 A * | 6/1991 | Lesea | H05B 41/2821 315/219 |

(Continued)

*Primary Examiner* — Raymond R Chai
(74) *Attorney, Agent, or Firm* — Michael Czarnecki; Glen Farbanish; Philip Smith

(57) ABSTRACT

A dimmable ballast circuit for a compact fluorescent lamp controls the intensity of a lamp tube in response to a phase-control voltage received from a dimmer switch. The ballast circuit comprises a phase-control-to-DC converter circuit that receives the phase-control voltage, which is characterized by a duty cycle defining a target intensity of the lamp tube, and generates a DC voltage representative of the duty cycle of the phase-control voltage. Changes in the duty cycle of the phase-control voltage that are below a threshold amount are filtered out by the converter circuit, while intentional changes in the duty cycle of the phase-control voltage are reflected in changes in the target intensity level and thereby the intensity level of the lamp tube.

15 Claims, 12 Drawing Sheets

Related U.S. Application Data continuation of application No. 16/119,670, filed on Aug. 31, 2018, now Pat. No. 10,805,994, which is a continuation of application No. 15/783,604, filed on Oct. 13, 2017, now Pat. No. 10,070,507, which is a continuation of application No. 15/077,090, filed on Mar. 22, 2016, now Pat. No. 9,795,019, which is a continuation of application No. 14/323,495, filed on Jul. 3, 2014, now Pat. No. 9,326,356, which is a division of application No. 13/464,358, filed on May 4, 2012, now Pat. No. 8,803,432.

(60) Provisional application No. 61/484,481, filed on May 10, 2011.

(56) References Cited

U.S. PATENT DOCUMENTS

| | | | | |
|---|---|---|---|---|
| 5,245,253 | A | * | 9/1993 | Quazi ............... H05B 41/2925 315/DIG. 4 |
| 5,245,523 | A | | 9/1993 | Juzswik |
| 5,463,280 | A | | 10/1995 | Johnson |
| 5,530,321 | A | * | 6/1996 | Sears ............... H05B 41/2881 315/282 |
| 5,872,429 | A | | 2/1999 | Xia et al. |
| 5,925,990 | A | * | 7/1999 | Crouse ............... H05B 41/36 315/307 |
| 6,111,368 | A | | 8/2000 | Luchaco |
| 6,359,393 | B1 | * | 3/2002 | Brown ............... H05B 41/3925 315/307 |
| 6,452,344 | B1 | | 9/2002 | MacAdam et al. |
| 6,642,669 | B1 | | 11/2003 | MacAdam et al. |
| 6,982,528 | B2 | | 1/2006 | Cottongim et al. |
| 7,061,191 | B2 | | 6/2006 | Chitta |
| 7,321,202 | B2 | | 1/2008 | Chitta |
| 7,436,131 | B2 | | 10/2008 | Cottongim et al. |
| 7,675,250 | B2 | | 3/2010 | Chitta et al. |
| 7,830,093 | B2 | | 11/2010 | Chitta |
| 7,911,156 | B2 | | 3/2011 | Cottongim et al. |
| 7,940,015 | B2 | | 5/2011 | Chitta et al. |
| 8,008,866 | B2 | | 8/2011 | Newman, Jr. et al. |
| 8,049,430 | B2 | | 11/2011 | Newman, Jr. et al. |
| 8,324,822 | B2 | * | 12/2012 | Peng ............... H05B 45/385 315/172 |
| 8,358,078 | B2 | | 1/2013 | Natarelli |
| 8,436,548 | B2 | * | 5/2013 | Anissimov ......... H05B 41/3924 315/307 |
| 8,803,432 | B2 | | 8/2014 | Hausman, Jr. |
| 9,795,019 | B2 | | 10/2017 | Hausman, Jr. |
| 10,070,507 | B2 | | 9/2018 | Hausman, Jr. |
| 11,573,251 | B2 | * | 2/2023 | Iwaki ............... G01R 19/0053 |
| 2002/0158591 | A1 | | 10/2002 | Ribarich et al. |
| 2004/0239263 | A1 | | 12/2004 | Vakil et al. |
| 2008/0258637 | A1 | | 10/2008 | Leung |
| 2008/0278080 | A1 | * | 11/2008 | Yu ............... H05B 41/295 315/308 |
| 2010/0213859 | A1 | | 8/2010 | Shteynberg et al. |
| 2011/0080110 | A1 | | 4/2011 | Nuhfer et al. |
| 2011/0148318 | A1 | * | 6/2011 | Shackle ............... H05B 45/10 315/291 |
| 2013/0293139 | A1 | * | 11/2013 | Sadwick ............... H05B 45/28 315/224 |

* cited by examiner

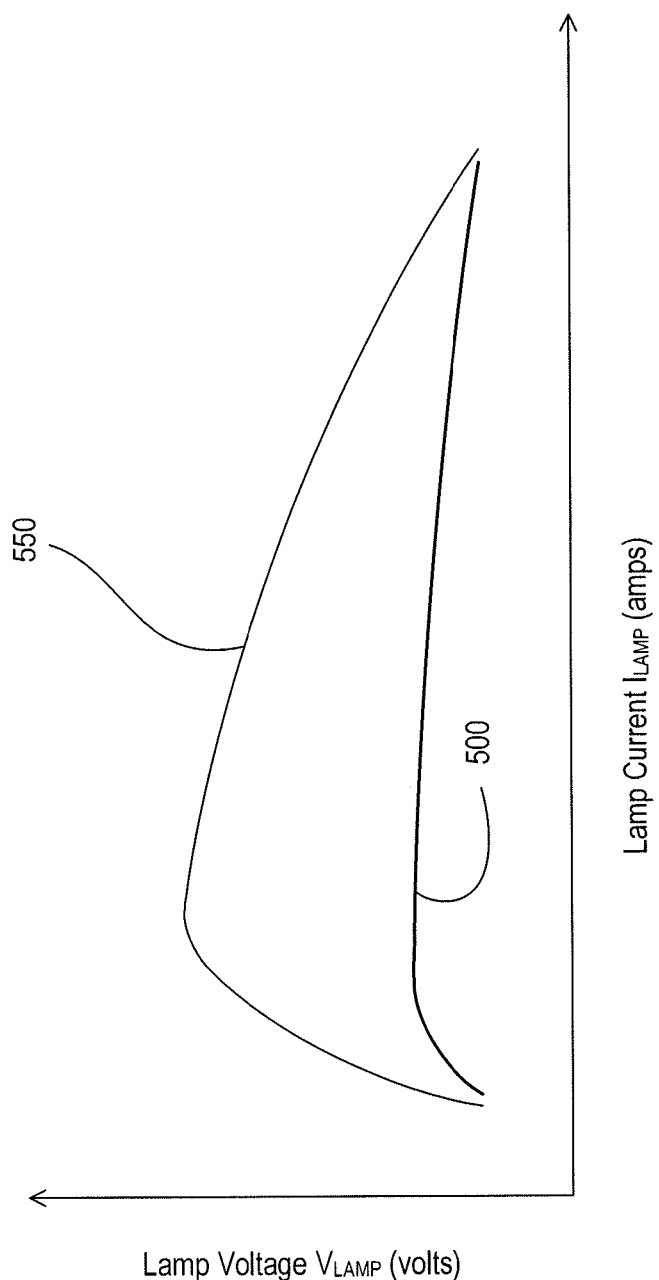

METHOD AND APPARATUS FOR DETERMINING A TARGET LIGHT INTENSITY FROM A PHASE-CONTROL SIGNAL

CROSS REFERENCES TO RELATED APPLICATIONS

This application is a continuation of U.S. patent application Ser. No. 17/066,649, filed Oct. 9, 2020; which is a continuation of U.S. patent application Ser. No. 16/119,670, filed on Aug. 31, 2018, now U.S. Pat. No. 10,805,994, issued Oct. 13, 2020; which is a continuation of U.S. patent application Ser. No. 15/783,604, filed Oct. 13, 2017, now U.S. Pat. No. 10,070,507, issued Sep. 4, 2018; which is a continuation of U.S. patent application Ser. No. 15/077,090, filed Mar. 22, 2016, now U.S. Pat. No. 9,795,019, issued Oct. 17, 2017; which is a continuation of U.S. patent application Ser. No. 14/323,495, filed Jul. 3, 2014, now U.S. Pat. No. 9,326,356, issued Apr. 26, 2016; which is a divisional application of U.S. patent application Ser. No. 13/464,358, filed May 4, 2012, now U.S. Pat. No. 8,803,432, issued Aug. 12, 2014; which is a non-provisional application of commonly-assigned U.S. Provisional Patent Application No. 61/484,481, filed May 10, 2011, the entire disclosures of which are hereby incorporated by reference.

BACKGROUND OF THE INVENTION

Field of the Invention

The present invention relates to a load control device for controlling the amount of power delivered to an electrical load, such as a lighting load, and more particularly, a phase-control-to-DC converter circuit for determining a target intensity level for the lighting load from a phase-control signal.

Description of the Related Art

In order to save energy, high-efficiency lighting loads, such as, for example, compact fluorescent lamps (CFLs) and light-emitting diode (LED) light sources, are being used in place of or as replacements for conventional incandescent or halogen lamps. High-efficiency light sources typically consume less power and provide longer operational lives as compared to incandescent and halogen lamps. FIG. 1 is a simplified block diagram of a prior art lighting control system 10 having a screw-in compact fluorescent lamp 20. The screw-in compact fluorescent lamp 20 comprises a fluorescent lamp tube 22, which may be formed in a spiral (as shown in FIG. 1). The screw-in compact fluorescent lamp 20 also comprises an enclosure 24 for housing a load regulation circuit 40 (FIG. 2), e.g., an electronic ballast circuit, which is electrically coupled to the lamp tube 22 for illuminating the lamp tube. The screw-in compact fluorescent lamp 20 has a screw-in base 26 adapted to be coupled to a standard Edison socket. The lamp tube 22 of a typical prior art screw-in compact fluorescent lamp 20 is filled with a fill gas of 100% argon at a pressure of approximately 4 Torr.

The lighting control system 10 also comprises a "two-wire" dimmer switch 30, which is coupled in series between an alternating-current (AC) power source 15 and the screw-in compact fluorescent lamp 20 for controlling the intensity of the lamp tube 22. The dimmer switch 30 may be adapted to be mounted to a standard electrical wallbox and comprises a hot terminal H coupled to the AC power source 15 for receiving an AC mains line voltage $V_{AC}$, and a dimmed-hot terminal DH coupled to the screw-in compact fluorescent lamp 20. The dimmer switch 30 does not require a direct connection to the neutral side N of the AC power source 15. Examples of prior art dimmer switches are described in greater detail is commonly-assigned U.S. Pat. No. 5,248,919, issued Sep. 29, 1993, entitled LIGHTING CONTROL DEVICE; U.S. Pat. No. 6,969,959, issued Nov. 29, 2005, entitled ELECTRONIC CONTROL SYSTEMS AND METHODS; and U.S. Pat. No. 7,687,940, issued Mar. 30, 2010, entitled DIMMER SWITCH FOR USE WITH LIGHTING CIRCUITS HAVING THREE-WAY SWITCHES, the entire disclosures of which are hereby incorporated by reference.

The dimmer switch 30 comprises a bidirectional semiconductor switch 32 coupled between the hot terminal H and the dimmed hot terminal DH for conducting a load current LOAD through the screw-in compact fluorescent lamp 20. The bidirectional semiconductor switch 32 may comprise a single device, such as a triac, or a combination of devices, such as, two field-effect transistors (FETs) or insulated-gate bipolar junction transistors (IGBTs) coupled in anti-series connection. To control the amount of power delivered to the lamp tube 22, the bidirectional semiconductor switch 32 is controlled to be conductive and non-conductive for portions of a half-cycle of the AC power source 15, such that the bidirectional semiconductor switch is rendered conductive for a conduction time $T_{ON}$ each half-cycle. The dimmer switch 30 may comprise a toggle actuator for turning the high-efficiency lamp tube 22 on and off and an intensity adjustment actuator for adjusting the intensity of the lamp tube 22 between a low-end intensity and a high-end intensity.

The dimmer switch 30 further comprises a control circuit 34 coupled in parallel with the bidirectional semiconductor switch 32 for conducting a control circuit $I_{CNTL}$ through the screw-in compact fluorescent lamp 20. The control circuit 34 is coupled to a control input of the bidirectional semiconductor switch 32 for rendering the bidirectional semiconductor switch conductive and non-conductive to generate a phase-control voltage $V_{PC}$ using either the forward phase-control dimming technique or the reverse phase-control technique. Accordingly, the bidirectional semiconductor switch 32 is rendered conductive for the conduction time $T_{CON}$ each half-cycle, thus setting a duty cycle $DC_{PC}$ of the phase-control voltage $V_{PC}$. The control circuit 34 may be operable to provide, for example, a constant gate drive to the bidirectional semiconductor switch 32, such that the bidirectional semiconductor switch will remain conductive independent of the magnitude of the load current $I_{LOAD}$ conducted through the bidirectional semiconductor switch and the screw-in compact fluorescent lamp 20. An example of a two-wire dimmer switch having a constant gate drive control circuit is described in greater detail in commonly-assigned, co-pending U.S. patent application Ser. No. 12/952,920, filed Nov. 23, 2010, entitled TWO-WIRE DIMMER SWITCH FOR LOW-POWER LOADS, the entire disclosure of which is hereby incorporated by reference.

The screw-in base 26 of the compact fluorescent lamp 20 provides for only two electrical connections: a phase-control connection PC to the dimmer switch 30 for receiving the phase-control voltage $V_{PC}$ and a neutral connection NC to the neutral side N of the AC power source 15. The load regulation circuit 40 of the screw-in compact fluorescent lamp 20 is operable to adjust the intensity of the lamp tube 22 between the low-end intensity and the high-end intensity in response to the duty-cycle $DC_{PC}$ of the phase-control signal $V_{PC}$ (i.e., the conduction time of the bidirectional semiconductor switch 32 of the dimmer switch 30).

With forward phase-control dimming, the bidirectional semiconductor switch 32 is rendered conductive at some point within each AC line voltage half-cycle and remains conductive until approximately the next voltage zero-crossing, such that the bidirectional semiconductor switch is conductive for the conduction time each half-cycle. A zero-crossing is defined as the time at which the AC line voltage transitions from positive to negative polarity, or from negative to positive polarity, at the beginning of each half-cycle. Forward phase-control dimming is often used to control energy delivered to a resistive or inductive load, which may include, for example, an incandescent lamp or a magnetic low-voltage transformer. The bidirectional semiconductor switch of a forward phase-control dimmer switch is typically implemented as a thyristor, such as a triac or two silicon-controlled rectifiers (SCRs) coupled in anti-parallel connection, since a thyristor becomes non-conductive when the magnitude of the current conducted through the thyristor decreases to approximately zero amps. Thyristors are typically characterized by a rated latching current and a rated holding current, and comprise two main terminals and a control terminal. The current conducted through the main terminals of the thyristor must exceed the latching current for the thyristor to become fully conductive. In addition, the magnitude of the load current LOAD conducted through the main terminals of the thyristor must remain above the holding current for the thyristor to remain in full conduction.

The control circuits of many forward phase-control dimmers comprise analog control circuits (such as timing circuits) for controlling when the thyristor is rendered conductive each half-cycle of the AC power source. The analog control circuit typically comprises a potentiometer, which may be adjusted in response to a user input provided from, for example, a linear slider control or a rotary knob in order to control the amount of power delivered to the lighting load. The analog control circuit is typically coupled in parallel with the thyristor and conducts a small timing current through the lighting load when the thyristor is non-conductive.

With reverse phase-control dimming, the bidirectional semiconductor switch 32 is rendered conductive at the zero-crossing of the AC line voltage and rendered non-conductive at some point within each half-cycle of the AC line voltage, such that the bidirectional semiconductor switch is conductive for a conduction time each half-cycle. The bidirectional semiconductor switch of reverse phase-control dimmers typically comprises two field-effect transistors (FETs) in anti-serial connection, or the like. Accordingly, prior art reverse phase-control dimmer switches have required advanced control circuits (such as microprocessors) for controlling the operation of the FETs, and power supplies for powering the microprocessors. In order to properly charge, the power supply of such a two-wire dimmer switch must develop an amount of voltage across the power supply and must conduct a charging current from the AC power source through the electrical load, in many instances even when the lighting load is off.

FIG. 2 is a simplified block diagram of the load regulation circuit 40 of the prior art screw-in compact fluorescent lamp 20. The load regulation circuit 40 comprises an electromagnetic interference (EMI) filter 50 for preventing noise generated by the load regulation circuit from being conducted on the AC mains wiring. A full-wave bridge rectifier 52 receives the phase-control voltage $V_{PC}$ from the EMI filter 50 and generates a rectified voltage $V_{RECT}$. The rectified voltage $V_{RECT}$ is coupled to a bus capacitor $C_{BUS}$ through a diode D54 for generating a direct-current (DC) bus voltage $V_{BUS}$ across the bus capacitor. The load regulation circuit 40 further comprises an inverter circuit 56 for generating a high-frequency square-wave voltage $V_{SQ}$ from the rectified voltage $V_{RECT}$, and a resonant tank circuit 58 for receiving the square-wave voltage $V_{SQ}$ and producing a substantially sinusoidal high-frequency AC voltage $V_{LAMP}$ (i.e., an arc voltage or lamp voltage), which is provided to the lamp tube 22. The inverter circuit 56 adjusts the operating frequency $f_{OP}$ of the square-wave voltage $V_{SQ}$ in order to adjust the intensity of the lamp tube 22.

The load regulation circuit 40 further comprises a phase-to-DC converter circuit 60 for receiving the rectified voltage $V_{RECT}$ and generating a DC voltage $V_{DC}$ that has a magnitude that is representative of the duty-cycle $DC_{PC}$ of the phase-control signal $V_{PC}$, and a lamp current sense circuit 62 that generates a lamp current control signal $V_{ILAMP}$ representative of a magnitude of a lamp current $I_{LAMP}$ conducted through the lamp tube 22. A control circuit 64 is coupled to the inverter circuit 56 for adjusting an operating frequency $f_{OP}$ of the square wave voltage $V_{SQ}$ and thus the magnitude of the lamp current $I_{LAMP}$ in response to the duty-cycle $DC_{PC}$ of the phase-control signal $V_{PC}$ and the magnitude of the lamp current $I_{LAMP}$. The load regulation circuit 40 also comprises a power supply 66 that receives the bus voltage $V_{BUS}$ and generates a DC voltage $V_{CC}$ for powering the control circuit 64.

Since the dimmer switch 30 is a two-wire dimmer switch, the compact fluorescent lamp 20 receives both power for energizing the lamp tube 22 and information for determining the target intensity of the lamp tube from the phase-control signal $V_{PC}$. The phase-to-DC circuit 60 typically comprises a filter circuit for preventing voltage fluctuations in the AC mains line voltage $V_{AC}$ of the AC power source 15 or noise on the AC mains line voltage $V_{AC}$ from altering the magnitude of the DC voltage $V_{DC}$ generated by the phase-to-DC converter circuit 60. Therefore, there is typically a delay time period between a change in the duty-cycle $DC_{PC}$ of the phase-control signal $V_{PC}$ and a resulting change in the magnitude of the DC voltage $V_{DC}$ generated by the phase-to-DC converter circuit 60. If the intensity adjustment actuator of the dimmer switch 30 is controlled such that the target intensity is quickly reduced from the high-end intensity to the low-end intensity, the magnitude of the phase-control signal $V_{PC}$ (and thus the amount of power available to the load regulation circuit 40) will quickly decrease while the control circuit 64 is still controlling the intensity of the lamp tube 22 to the high-end intensity (due to the delay time period). Accordingly, the bus capacitor $C_{BUS}$ will quickly discharge, such that the control circuit 64 becomes unpowered and the lamp tube 22 is extinguished, which, of course, is undesirable.

FIGS. 3A and 3B show example waveforms of the DC bus voltage $V_{BUS}$ and the lamp current LAMP, respectively. As shown in FIG. 3A, the bus voltage $V_{BUS}$ is characterized by some low-frequency voltage ripple having a frequency approximately equal to twice the frequency of the AC power source 15 (e.g., approximately 120 Hz). The control circuit 64 is typically characterized by a corner frequency of approximately 10-20 Hz, and thus controls the inverter circuit 56 to adjust the operating frequency $f_{OP}$ of the square-wave voltage $V_{SQ}$ at a relatively slow rate in response to the lamp current control signal $V_{ILAMP}$. Since the corner frequency (i.e., approximately 10-20 Hz) is less than the frequency of the voltage ripple of the bus voltage $V_{BUS}$ (i.e., approximately 120 Hz), the operating frequency $f_{OP}$ of the square-wave voltage $V_{SQ}$ (and thus the lamp current $I_{LAMP}$) is maintained relatively constant over short time intervals (e.g., during a single half-cycle $T_{HC}$ of the AC power source 15, i.e., approximately 8.33 msec). As a result, the lamp current LAMP has an envelope $I_{ENV}$ that is characterized by the frequency of the voltage ripple of the bus voltage $V_{BUS}$ (as shown in FIG. 3B). This fluctuation (or ripple) in the envelope $I_{ENV}$ of the lamp current $I_{LAMP}$ can cause undesirable flicker in the lamp tube 22.

Accordingly, there is a need for a dimmable screw-in compact fluorescent lamp having an integral electronic ballast circuit that avoids the disadvantages of the prior art circuits.

SUMMARY OF THE INVENTION

According to an embodiment of the present invention, a load control circuit controls a target intensity level of a lighting load in response to a duty cycle of a phase-control voltage by adjusting the target intensity level of the lighting load using a slow time constant in response to changes in the duty cycle of the phase-control voltage that are below a threshold amount, and adjusts the target intensity level of the lighting load using a fast time constant less than the first time constant in response to intentional changes in the duty cycle of the phase-control voltage. The load control circuit comprises a bus-voltage-generating circuit receiving the phase-control voltage and producing a DC bus voltage, a load regulation circuit receiving said DC bus voltage and adapted to be coupled to the lighting load for adjusting the intensity of the lighting load, and a control circuit operable to determine a target intensity level of the lighting load in response to the duty cycle of the phase-control voltage. The control circuit controls the load regulation circuit to adjust the intensity level of the lighting load in response to the duty cycle of the phase-control voltage and an actual-intensity signal related to the actual intensity level of the lighting load.

In addition, a phase-control-to-DC converter circuit for a load control device for controlling the amount of power delivered to an electrical load is also described herein. The phase-control-to-DC converter circuit receives a phase-control voltage characterized by a duty cycle for determining a target amount of power to be delivered to the electrical load and generates a DC voltage representative of the duty cycle of the phase-control voltage. The phase-control-to-DC converter circuit comprises a first filter circuit for generating a first filtered voltage in response to the duty cycle of the phase-control voltage, and a second filter circuit for receiving a first filtered voltage and generating a second filtered voltage (i.e., DC voltage representative of the duty cycle of the phase-control voltage) in response to the first filtered voltage. The first filter circuit is characterized by a first time constant, while the second filter circuit is characterized by a second time constant having a nominal value that is slower than a value of the first time constant of the first filter circuit. When the difference between the magnitudes of the first and second filtered voltages exceeds a predetermined threshold, the second time constant has a fast value that is faster than the nominal value, such that the magnitude of the second filtered voltage quickly changes to be equal to the magnitude of the first filtered voltage.

According to another embodiment of the present invention, a control circuit for a load control circuit for a lighting load receives a phase-control voltage that is characterized by a duty cycle for determining a target intensity level of the lighting load, and operates to adjust said target intensity level of said lighting load using a slow time constant in response to changes in said duty cycle of said phase-control voltage that are below a threshold amount, and adjust said target intensity level of said lighting load using a fast time constant less than the first time constant in response to intentional changes in said duty cycle of said phase-control voltage. The control circuit comprises a phase-control-voltage converter circuit for converting the phase-control voltage into a target signal that is used to determine the target intensity level of the lighting load, and an error amplifier circuit for comparing the target signal and an actual-intensity signal related to the actual intensity level of the lighting load and generating a drive control signal for controlling said lighting load to said target intensity level.

According to yet another embodiment of the present invention, a lighting control system receiving power from an AC power source comprises a dimmable high-efficiency lighting load comprises a light source and a load regulation circuit for illuminating the light source, and a two-wire dimmer switch adapted to be coupled in series electrical connection between the AC power source and the dimmable compact fluorescent lamp for generating a phase-control voltage characterized by a duty cycle. The load regulation circuit receives the phase-control voltage and illuminates the light source in response to the phase-control voltage. The load regulation circuit comprises a control circuit operable to determine a target intensity level of said lamp in response to the duty cycle of the phase-control voltage. The control circuit converts the phase-control voltage into a DC target intensity signal, and controls the load regulation circuit in response to the DC target intensity signal to adjust the intensity of the light source to target intensity level. The control circuit adjusts said target intensity level of said lamp using a slow time constant in response to changes in said duty cycle of said phase-control voltage that are below a threshold amount, and adjusts said target intensity level of said lamp using a fast time constant less than the first time constant in response to intentional changes in said duty cycle of said phase-control voltage.

Further, a method of converting a duty cycle of a phase-control voltage to a DC voltage in a load control device for controlling the amount of power delivered to an electrical load, where the duty cycle of the phase-control voltage is used to determine a target amount of power to be delivered to the electrical load, is also described herein. The method comprises the steps of: (1) generating a first filtered signal in response to the duty cycle of the phase-control voltage using a first time constant; (2) generating a second filtered signal in response to the first filtered signal using a second nominal time constant that is slower than the first time constant when the difference between the magnitudes of the first and second filtered signals is below a predetermined threshold; and (3) generating the second filtered signal in response to the first filtered voltage using a third fast time constant that is faster than the nominal time constant when the difference between the magnitudes of the first and second filtered signals exceeds a predetermined threshold, such that the magnitude of the second filtered signal quickly changes to be equal to the magnitude of the first filtered signal.

According to another embodiment of the present invention, a method of controlling a compact fluorescent lamp comprises: (1) receiving a phase-control voltage characterized by a duty cycle set by a dimmer switch that operates according to either a forward phase-control method or reverse phase-control method; (2) determine a target intensity level of said lamp in response to the duty cycle of the phase-control voltage; (3) providing a sinusoidal output voltage to said lamp for illuminating said lamp to said target intensity level; (4) adjusting said target intensity level of said lamp using a slow time constant in response to changes in said duty cycle of said phase-control voltage that are below a threshold amount; and (5) adjusting said target intensity level of said lamp using a fast time constant less than the first time constant in response to intentional changes in said duty cycle of said phase-control voltage.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which:

FIG. 9 is an example plot of the magnitude of a lamp voltage with respect to the magnitude of a lamp current of the screw-in compact fluorescent lamp of FIG. 4;

DETAILED DESCRIPTION OF THE INVENTION

Figure 1:
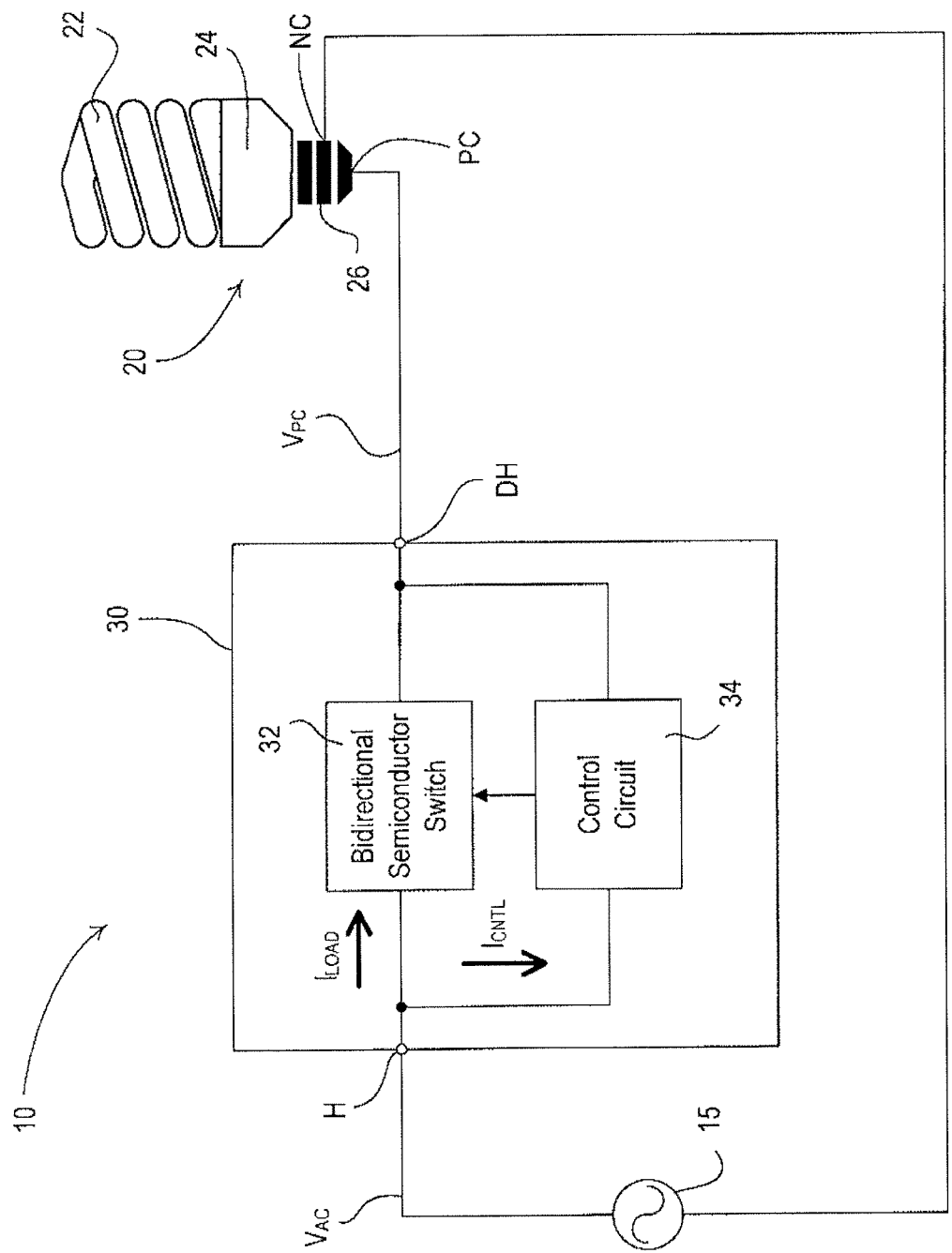
FIG. 1 is a simplified block diagram of a prior art lighting control system including a "two-wire" dimmer switch for controlling the amount of power delivered to a screw-in compact fluorescent lamp.
Figure 2:
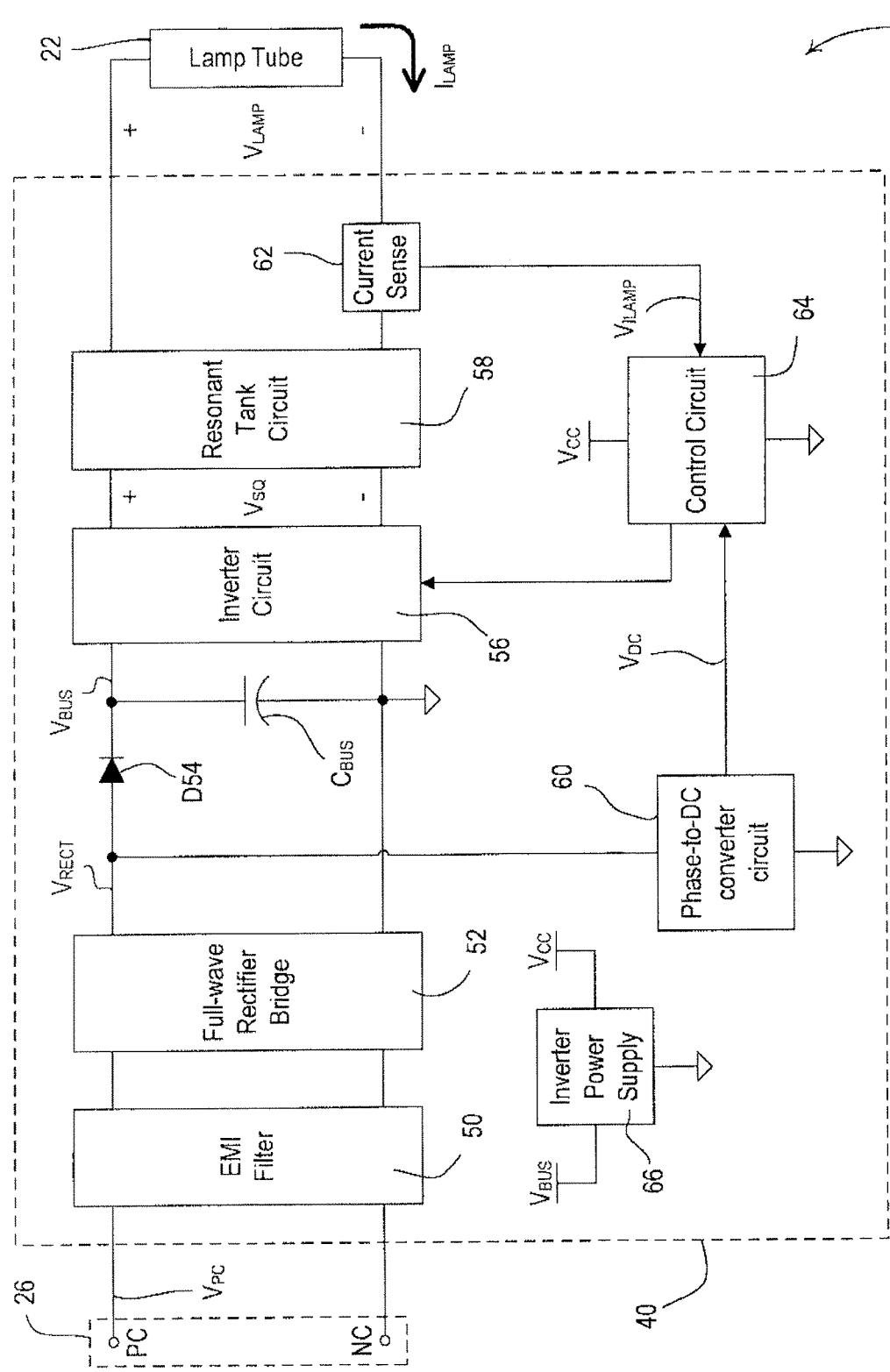
FIG. 2 is a simplified block diagram of the screw-in compact fluorescent lamp of the lighting control system of FIG. 1.
Figure 3A:
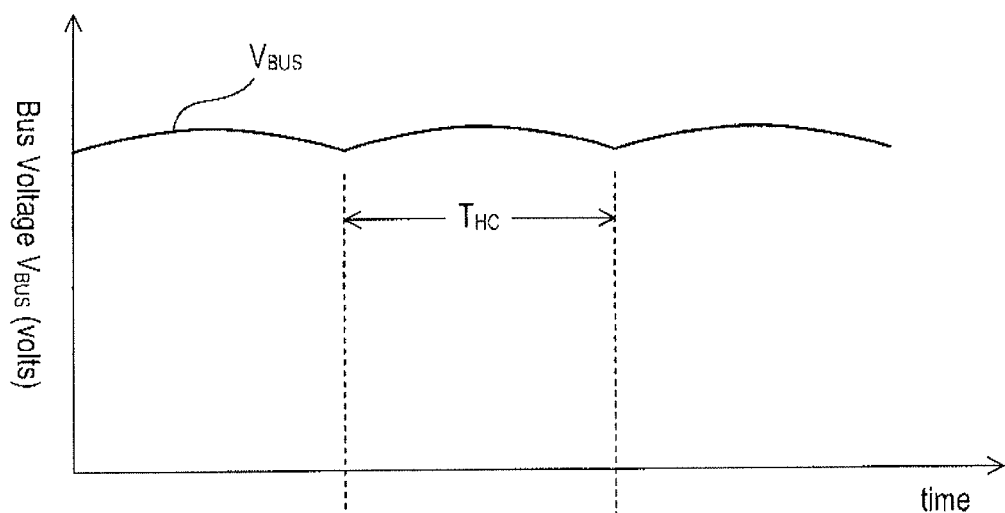
FIG. 3A shows an example waveform of a bus voltage of the screw-in compact fluorescent lamp of FIG. 2.
Figure 3B:
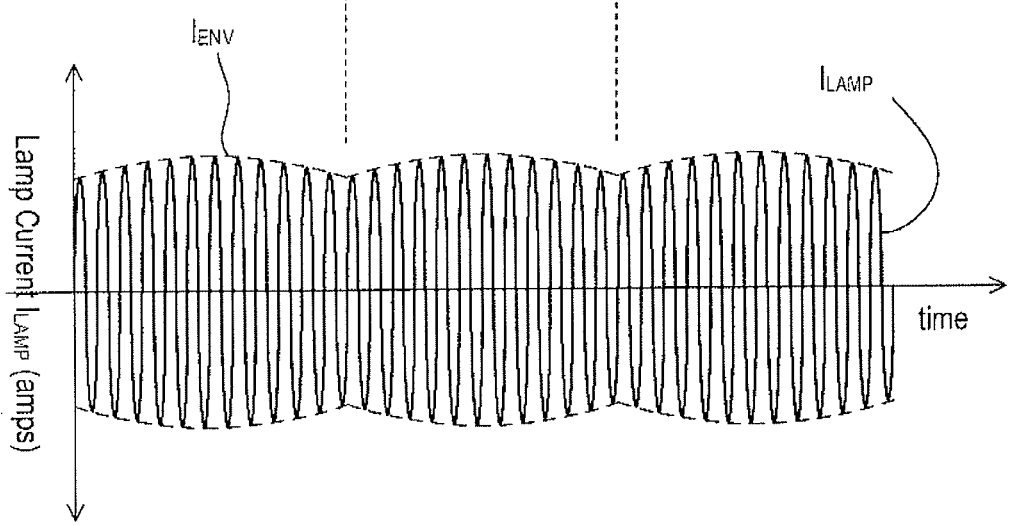
FIG. 3B shows an example waveform of a lamp current of the screw-in compact fluorescent lamp of FIG. 2.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 4:
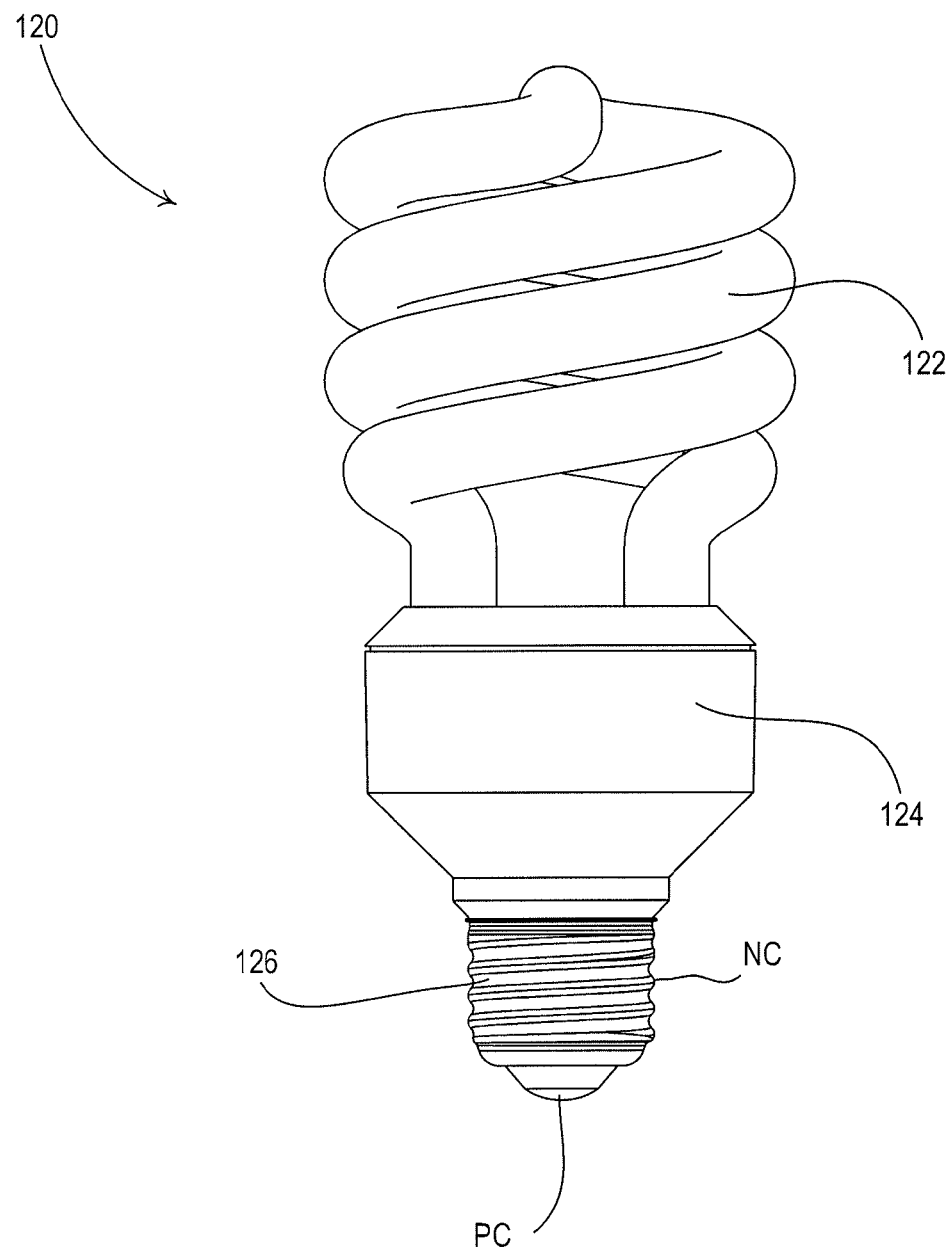
FIG. 4 is a side view of a dimmable screw-in compact fluorescent lamp according to a first embodiment of the present invention.

FIG. 4 is a side view of a dimmable screw-in compact fluorescent lamp 120 according to a first embodiment of the present invention. The dimmable screw-in compact fluorescent lamp 120 comprises a light source, e.g., a fluorescent lamp tube 122, which may be formed in a spiral (as shown in FIG. 4), in two or more U-bends, or in any other suitable form. The lamp tube 122 may be filled with a fill-gas mixture having a fall-gas pressure of approximately 2 Torr and a fill-gas ratio of approximately 85:15 argon to neon. The dimmable screw-in compact fluorescent lamp 120 further comprises an enclosure 24 for housing a load regulation circuit 130 (FIG. 5), e.g., an electronic ballast circuit, which is electrically coupled to the lamp tube 122 for illuminating the lamp tube.

The screw-in compact fluorescent lamp 120 has a screw-in base 126 adapted to be coupled to a standard Edison socket, such that the lamp is adapted to be coupled to a two-wire dimmer switch (such as the dimmer switch 30) via the phase-control connection PC of the screw-in base 126 and to the neutral side N of an AC power source via the neutral connection NC (as in the prior art lighting control system 100 shown in FIG. 1). As defined herein, a "two-wire" dimmer switch or load control device does not require a direct connection to the neutral side N of the AC power source. In other words, all currents conducted by the two-wire dimmer switch must also be conducted through the load. A two-wire dimmer switch may have only two terminals (i.e., the hot terminal H and the dimmed hot terminal DH as shown in FIG. 1). Alternatively, a two-wire dimmer switch could comprise a three-way dimmer switch that may be used in a three-way lighting system and has at least three load terminals, but does not require a neutral connection. In addition, a two-wire dimmer switch may comprise an additional connection that provides for communication with a remote control device (for remotely controlling the dimmer switch), but does not require the dimmer switch to be directly connected to neutral.

Figure 5:
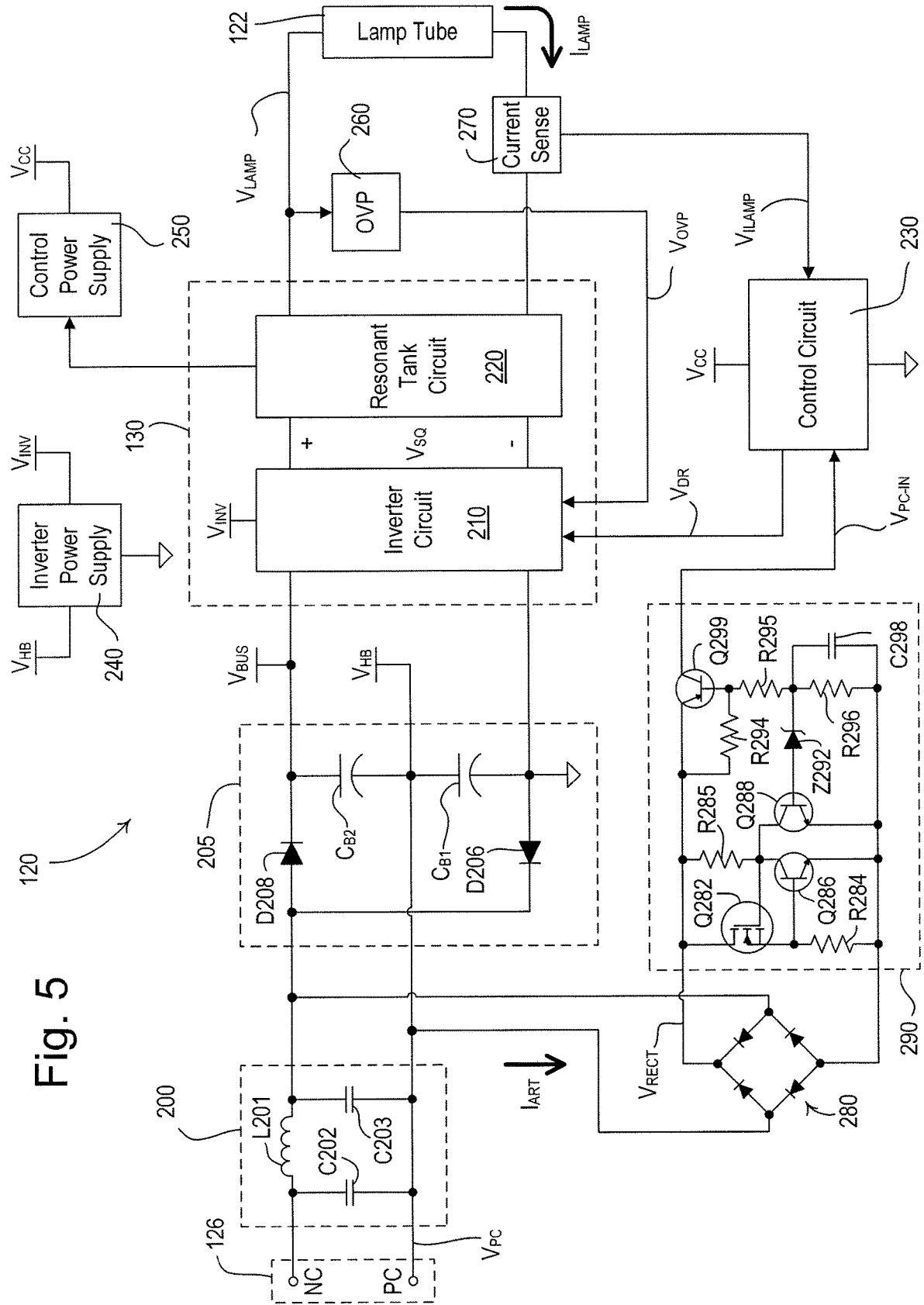
FIG. 5 is a simplified schematic diagram of the screw-in compact fluorescent lamp of FIG. 4.

FIG. 5 is a simplified schematic diagram of a dimmable screw-in compact fluorescent lamp 120 according to the first embodiment of the present invention. As previously mentioned, the screw-in base 126 provides for only two electrical connections: the phase-control connection PC to the dimmer switch for receiving the phase-control voltage $V_{PC}$ and the neutral connection NC to the neutral side N of the AC power source. The load regulation circuit 130 of the screw-in compact fluorescent lamp 120 is operable to adjust the intensity of the lamp tube 122 to a target intensity $L_{TRGT}$ (i.e., a desired intensity) in response to the duty-cycle $DC_{PC}$ of the phase-control signal $V_{PC}$. The target intensity $L_{TRGT}$ may range between a low-end intensity $L_{LE}$ (e.g., approximately 1%) and a high-end intensity $L_{HE}$ (e.g., approximately 100%).

The screw-in compact fluorescent lamp 120 comprises a filter network 200 coupled to the phase-control connection PC and the neutral connection NC of the connector 126 for receiving the phase-control voltage $V_{PC}$ from the dimmer switch 30. The filter network 200 comprises an inductor L201 (e.g., having an inductance of approximately 680 μH) and two capacitors C202, C203 (e.g., having capacitances of approximately 33 nF). The filter network 200 operates to prevent noise generated by the load regulation circuit 130 from being conducted on the AC mains wiring. The filter network 200 couples the phase-control voltage $V_{PC}$ to a voltage doubler circuit 205 (i.e., a bus-voltage-generating circuit), which generates a direct-current (DC) bus voltage $V_{BUS}$ across two series connected bus capacitors $C_{B1}$, $C_{B2}$. The first bus capacitor $C_{B1}$ conducts the load current LOAD through a diode D206 (and the dimmer switch 30) to charge during the positive half-cycles, while the second bus capacitor $C_{B2}$ conducts the load current $I_{LOAD}$ through a diode D208 to charge during the negative half-cycles. Accordingly, the peak magnitude of the bus voltage $V_{BUS}$ is approximately twice the peak voltage of the AC mains line voltage $V_{AC}$. A half-bus voltage $V_{HB}$ is generated across the first bus capacitor $C_{B1}$ and has a magnitude equal to approximately half of the bus voltage $V_{BUS}$.

The load regulation circuit 130 (i.e., the electronic ballast circuit) includes a half-bridge inverter circuit 210 for converting the DC bus voltage $V_{BUS}$ to a high-frequency square-wave voltage $V_{SQ}$ having an operating frequency $f_{OP}$. The load regulation circuit 130 further comprises an output filter circuit, e.g., a resonant tank circuit 220, for filtering the square-wave voltage $V_{SQ}$ to produce a substantially sinusoidal high-frequency AC voltage, which is coupled to the electrodes of the lamp tube 122. A control circuit 230 is coupled to the inverter circuit 210 for providing a drive control signal $V_{DR}$ to the inverter circuit 210 for adjusting the operating frequency $f_{OP}$ of the square wave voltage $V_{SQ}$ and thus the magnitude of a lamp current LAMP conducted through the lamp tube 122 in order to turn the lamp tube on and off and adjust the intensity of the lamp tube. Alternatively, the screw-in compact fluorescent lamp 120 could comprise a different high-efficiency lighting load, such as, a dimmable screw-in LED light source having an LED light engine, and the load regulation circuit 130 could comprise an LED driver. An example of the LED driver 102 is described in greater detail in commonly-assigned, co-pending U.S. patent application Ser. No. 12/813,908, filed Jun. 11, 2009, and U.S. patent application Ser. No. 13/416,741, filed Mar. 9, 2012, both entitled LOAD CONTROL DEVICE FOR A LIGHT-EMITTING DIODE LIGHT SOURCE, the entire disclosures of which are hereby incorporated by reference.

The screw-in compact fluorescent lamp 120 further comprises two power supplies: an inverter power supply 240 and a control power supply 250. The inverter power supply 240 receives the half-bus voltage $V_{HB}$ across the first bus capacitor $C_{B1}$ and generates a direct-current (DC) inverter supply voltage $V_{INV}$ (e.g., approximately 15 volts) for powering the control circuitry of the inverter circuit 210. The control power supply 250 draws current from the resonant tank circuit 220 and generates a DC control supply voltage $V_{CC}$ (e.g., approximately 12 volts) for powering the control circuit 230 while the inverter circuit 210 is generating the high-frequency square-wave voltage $V_{SQ}$. When the screw-in compact fluorescent lamp 120 is first powered up, the inverter power supply 240 is operable to generate the inverter supply voltage $V_{INV}$ before the control power supply 250 begins to produce the control supply voltage $V_{CC}$. After the inverter power supply 240 is generating the inverter supply voltage $V_{INV}$, the inverter circuit 210 is able to begin generating the high-frequency square-wave voltage $V_{SQ}$, such that the control power supply 250 is able to draw current from the resonant tank circuit 220. Accordingly, the control power supply 250 then produces the control supply voltage $V_{CC}$ to power the control circuit 230.

The screw-in compact fluorescent lamp 120 further comprises an over-voltage protection (OVP) circuit 260, which provides an OVP control signal $V_{OVP}$ to the inverter circuit 210 for protecting the lamp tube 122 and the load regulation circuit 130 during over-voltage conditions. A lamp current sense circuit 270 is coupled in series with the lamp tube 122 to conduct the lamp current $I_{LAMP}$ and to generate a lamp current control signal $V_{ILAMP}$ representative of a magnitude of the lamp current $L_{AMP}$. The screw-in compact fluorescent lamp 120 further comprises a rectifier circuit 280 (e.g., a full-wave rectifier diode bridge as shown in FIG. 5), which has AC terminals coupled to receive the phase-control voltage $V_{PC}$ from the filter network 200 and DC terminals for providing a rectified voltage $V_{RECT}$.

The rectified voltage $V_{RECT}$ is received by an artificial load circuit 290 for conducting an artificial load current $I_{ART}$ through the dimmer switch 30 in addition to the load current LOAD conducted by the bus capacitors $C_{B1}$, $C_{B2}$ when the bus capacitors are charging. If the dimmer switch 30 includes a triac for generating the phase-control voltage $V_{PC}$, the artificial load circuit 290 is able to conduct enough current to ensure that the magnitude of the total current conducted through the triac of the dimmer switch exceeds the rated latching and holding currents of the triac. In addition, the artificial load circuit 290 may conduct a timing current if the dimmer switch 30 comprises a timing circuit and may conduct a charging current if the dimmer switch comprises a power supply, such that these currents need not be conducted through the load regulation circuit 130 and do not affect the intensity of the lamp tube 122.

The artificial load circuit 290 comprises a current-passing switch, e.g., a FET Q282, coupled in series with a resistor R284 (e.g., having a resistance of approximately 12.4Ω), where the series combination of the drain-source junction of the FET Q282 and the resistor R284 is coupled across the DC terminals of the rectifier circuit 280. The gate of the FET Q282 is coupled to the drain of the FET Q282 through a resistor R285 (e.g., having a resistance of approximately 1 MΩ), such that the FET Q282 is rendered conductive and conducts the artificial load current $I_{ART}$ when the magnitude of the rectified voltage $V_{RECT}$ increases from approximately zero volts to exceed a turn-on threshold (e.g., approximately 4 volts). Accordingly, the FET Q282 is rendered conductive, such that the artificial load circuit 290 conducts the artificial load current $I_{ART}$ through the dimmer switch 30 after the triac is rendered conductive (if the dimmer switch is using the forward phase-control dimming technique), or shortly after the beginning of each half-cycle (if the dimmer switch is using the reverse phase-control dimming technique). The artificial load circuit 290 further comprises an NPN bipolar junction transistor Q286 having a base-emitter junction coupled across the resistor R284 and a collector coupled to the gate of the FET Q282. The transistor Q286 controls the FET Q282 in the linear region to provide over-current protection of the FET Q282 when the voltage across the resistor R284 exceeds the rated base-emitter voltage of the transistor Q286 (e.g., approximately 0.7 volt).

The artificial load circuit 290 also comprises an NPN bipolar junction transistor Q288 having a collector coupled to the gate of the FET Q282, and a zener diode Z292, having, for example, break-over voltage $V_{BR}$ of approximately 13.2 volts. Three resistors R294, R295, R296 are coupled in series between the DC terminals of the rectifier circuit 180 and have, for example, resistances of approximately 22 kΩ, 470 kΩ, and 150 kΩ, respectively. The zener diode Z292 is coupled between the base of the transistor Q288 and the junction of the resistors R295, R296. A capacitor C298 is coupled across the resistor R296 and has, for example, a capacitance of approximately 1000 pF. When the magnitude of the rectified voltage $V_{RECT}$ exceeds a turn-off threshold (e.g., approximately 60 volts), the zener diode Z292 conducts current into the base of the transistor Q288. Accordingly, the transistor Q288 is rendered conductive and the FET Q282 is rendered non-conductive, such that the artificial load circuit 290 stops conducting the artificial load current $I_{ART}$. If the dimmer switch 30 is using the forward phase-control dimming technique, the capacitor C298 provides some delay, such that the artificial load circuit 290 conducts the artificial load current $I_{ART}$ for a period of time after the triac is rendered conductive.

The artificial load circuit 290 also provides a phase-control input control signal $V_{PC-IN}$ to the control circuit 230. Specifically, the artificial load circuit 290 comprises a PNP bipolar junction transistor Q299 having a collector coupled to the control circuit 230 for providing the phase-control input control signal $V_{PC-IN}$. The emitter-base junction of the transistor Q299 is coupled across the resistor R294, such that the transistor Q299 is rendered conductive shortly after the triac is rendered conductive (with forward phase-control dimming) or shortly after the beginning of each half-cycle (with reverse phase-control dimming). The control circuit 230 uses the phase-control input control signal $V_{PC-IN}$ to determine the duty-cycle $DC_{PC}$ of the phase-control voltage $V_{PC}$ (i.e., the conduction time $T_{CON}$ of the bidirectional semiconductor switch 32 of the dimmer switch 30). The control circuit 230 determines the present magnitude of the lamp current $I_{LAMP}$ from the lamp current control signal $V_{ILAMP}$ received from the lamp current sense circuit 270. The control circuit 230 then adjusts the operating frequency $f_{OP}$ of the square wave voltage $V_{SQ}$ to control the magnitude of the lamp current $I_{LAMP}$ to a desired level that is dependent upon the duty-cycle $DC_{PC}$ of the phase-control voltage $V_{PC}$ to thus control the intensity of the lamp tube 122 to the target intensity $L_{TRGT}$.

Figure 6:
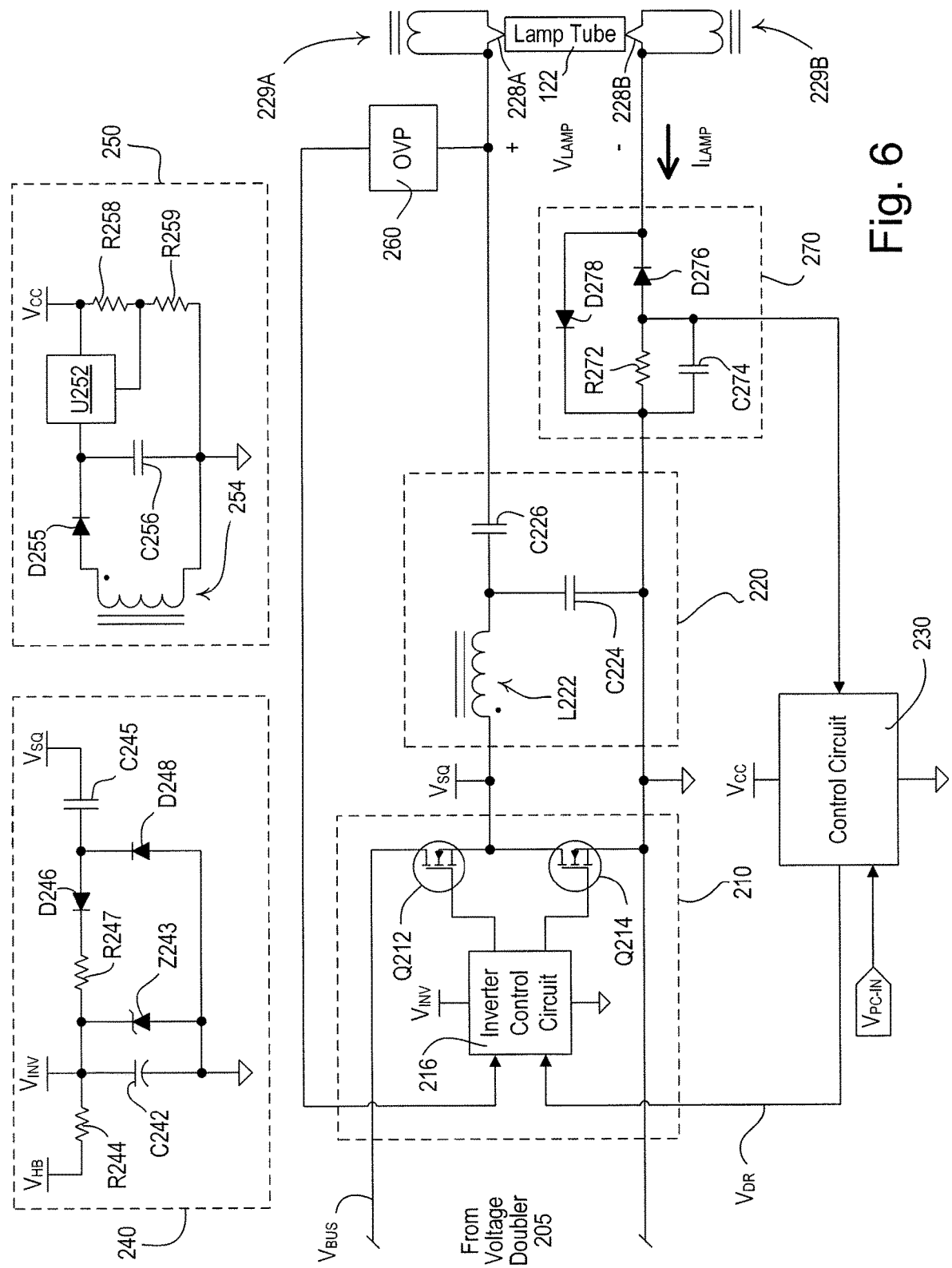
FIG. 6 is a simplified schematic diagram of the electrical circuitry of the screw-in compact fluorescent lamp of FIG. 4 showing a load regulation circuit and two power supplies in greater detail.

FIG. 6 is a simplified schematic diagram of the electrical circuitry of the screw-in compact fluorescent lamp 120 showing the inverter circuit 210, the resonant tank circuit 220, the inverter power supply 240, the control power supply 250, and lamp current sense circuit 270 in greater detail. The inverter circuit 210 comprises first and second series-connected switching devices (e.g., FETs Q212, Q214) and an inverter control circuit 216, which may comprise, for example, an inverter control integrated circuit (IC) U300 (FIG. 5), such as part number FAN7532, manufactured by Fairchild Semiconductor Incorporated. The inverter control IC U300 of the inverter control circuit 216 is powered by the inverter supply voltage $V_{INV}$ and controls the FETs Q212, Q214 in response to the drive control signal $V_{DR}$ received from the control circuit 230 as will be described in greater detail below with reference to FIG. 7. The inverter control circuit 216 renders the FETs Q212, Q214 conductive and non-conductive on a complementary basis (such that only one of the FETs is conducting at a time) using a constant duty cycle (e.g., approximately 50%). When the first FET Q212 is conductive, the output of the inverter circuit 210 is pulled up towards the bus voltage $V_{BUS}$. When the second FET Q214 is conductive, the output of the inverter circuit 210 is pulled down towards circuit common. The magnitude of the lamp current $I_{LAMP}$ conducted through the lamp tube 122 is controlled by adjusting the operating frequency $f_{OP}$ of the high-frequency square wave voltage $V_{SQ}$ generated by the inverter circuit 210.

The resonant tank circuit 220 comprises a resonant inductor L222 adapted to be coupled in series between the inverter circuit 210 and the lamp tube 122, and a resonant capacitor C224 adapted to be coupled in parallel with the lamp tube. For example, the inductor L222 may have an inductance of approximately 1.4 mH, while the resonant capacitor C224 may have a capacitance of approximately 1.2 nF, such that resonant tank circuit is characterized by a resonant frequency of approximately 110 kHz. The resonant tank circuit 220 further comprises a DC-blocking capacitor C226 that has a capacitance of, for example, approximately 2.7 nF and operates to minimize the DC component of the lamp current $I_{LAMP}$ conducted through the lamp tube 122.

When the lamp tube 122 is not illuminated and the control circuit 230 receives a command to turn the lamp tube on (from the phase-control voltage $V_{PC}$), the control circuit first preheats filaments 228A, 228B of the lamp tube 122 and then attempts to strike the lamp tube. The load regulation circuit 130 may comprise, for example, two filament windings 229A, 229B that are magnetically coupled to the resonant inductor L222 and electrically coupled to the respective filaments 228A, 228B for generating filament voltages for heating the filaments of the lamp tube 122 prior to striking the lamp. To preheat the filaments 228A, 228B, the inverter circuit 210 controls the operating frequency $f_{OP}$ of the square wave voltage $V_{SQ}$ to a preheat frequency $f_{PH}$ (e.g., approximately 150 kHz) for a preheat time period $T_{PH}$ (e.g., approximately 700 msec). An example of a ballast having a circuit for heating the filaments of a fluorescent lamp is described in greater detail in U.S. Pat. No. 7,586,268, issued Sep. 8, 2009, titled APPARATUS AND METHOD FOR CONTROLLING THE FILAMENT VOLTAGE IN AN ELECTRONIC DIMMING BALLAST, the entire disclosure of which is hereby incorporated by reference.

The inverter power supply 240 receives the half-bus voltage $V_{HB}$ developed across the first bus capacitor $C_{B1}$ and generates the inverter supply voltage $V_{INV}$ across a storage capacitor C242 (e.g., having a capacitance of approximately 1 µF). The inverter power supply 240 comprises a simple zener-regulated power supply having a zener diode Z243, which is coupled across the storage capacitor C242 and may have, for example, a break-over voltage of approximately 13.2 volts. When the screw-in compact fluorescent lamp 120 is first powered up, the storage capacitor C242 is able to charge by conducting a small trickle current from the AC power source 15 through a resistor R244 (e.g., having a resistance of approximately 392 kΩ) until the inverter supply voltage $V_{INV}$ is developed across the storage capacitor C242. After the magnitude of the inverter supply voltage $V_{INV}$ exceeds the rated operating voltage of the inverter control IC U300 of the inverter control circuit 216, the inverter control IC begins to control the FETs Q212, Q214 to be conductive and non-conductive to generate the square wave voltage $V_{SQ}$.

The inverter power supply 240 further comprises a snubber capacitor C245 that has, for example, a capacitance of approximately 470 pF and provides a path for charging the storage capacitor C242 after the inverter control circuit 216 begins generating the square wave voltage $V_{SQ}$. The snubber capacitor C245 is coupled between junction of the two FETs Q212, Q214 and the storage capacitor C242 through a diode D246 and a resistor R246 (e.g., having a resistance of approximately 5.6Ω). The storage capacitor C242 is able to charge when the first FET Q212 is conductive (i.e., when the square-wave voltage $V_{SQ}$ is being pulled high towards the bus voltage $V_{BUS}$). When the second FET Q214 is conductive and the square-wave voltage $V_{SQ}$ is being pulled low towards circuit common, the snubber capacitor C245 is able to discharge through the second FET Q214 and a diode D248. Accordingly, after the inverter control circuit 216 begins generating the square wave voltage $V_{SQ}$, the inverter power supply 240 is operable to generate the inverter supply voltage $V_{INV}$ by conducting current through the snubber capacitor C245 rather than conducting current through the resistor R244, which would needlessly dissipate an excessive amount of power.

The control power supply 250 comprises a linear regulator, for example, an adjustable linear regulator U252, such as part number LM317L, manufactured by Fairchild Semiconductor Incorporated. The control power supply 250 comprises a winding 254 magnetically coupled to the resonant inductor L222 of the resonant tank circuit 220 for generating an electromagnetically-coupled voltage, such that the linear regulator U252 is able to draw current from the resonant tank circuit through a diode D255 when the inverter control circuit 216 is generating the square-wave voltage $V_{SQ}$. A capacitor C256 is coupled across the input of the linear regulator U252 and has, for example, a capacitance of approximately 0.1 µF. A first resistor R258 is coupled between the output of the adjustable linear regulator U252 and the adjustment pin of the linear regulator, while a second resistor R259 is coupled between the adjustment pin and circuit common. For example, the first and second resistors R258, R259 may have resistances of approximately 475Ω and 5.23 kΩ, respectively, such that the control supply voltage $V_{CC}$ at the output of the linear regulator U252 has a nominal magnitude of approximately 15 volts.

Figure 7:
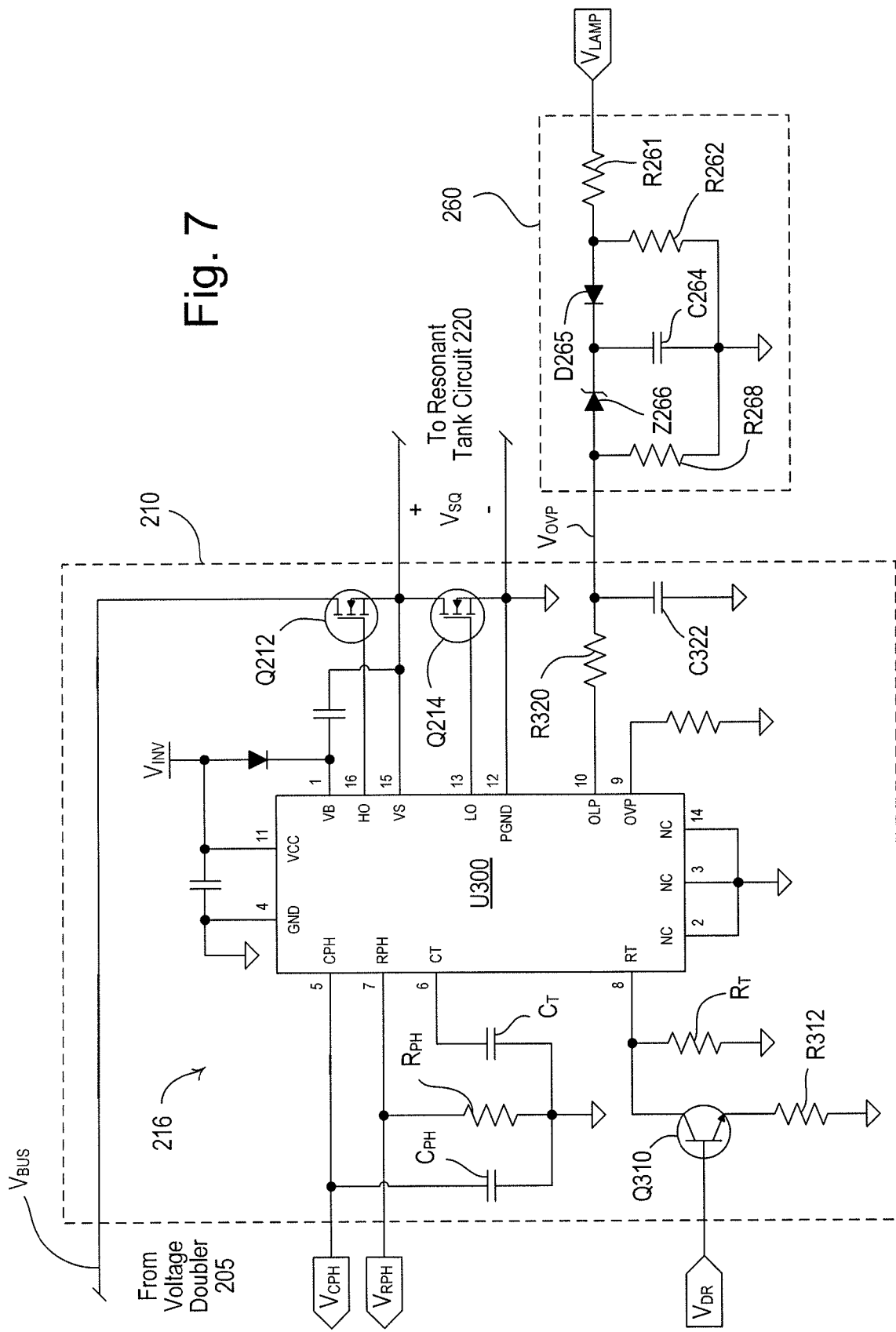
FIG. 7 is a simplified schematic diagram of an inverter circuit of the load regulation circuit and an over-voltage protection circuit of the screw-in compact fluorescent lamp of FIG. 4.

FIG. 7 is a simplified schematic diagram of the inverter circuit 210 and the OVP circuit 260. As previously mentioned, the inverter control circuit 216 includes the inverter control IC U300, which is powered by the inverter supply voltage $V_{INV}$. The inverter control IC U300 is directly coupled to the gates of the FETs Q212, Q214 for controlling the FETs to be conductive and non-conductive (via pins 16 and 13). The inverter control circuit 216 comprises a preheat-frequency-set resistor $R_{PH}$, which is coupled to a preheat-frequency-set input (pin 7) of the inverter control IC U300 for setting the preheat frequency $f_{PH}$. The preheat-frequency-set resistor $R_{PH}$ may have a resistance of, for example, approximately 27 kΩ, such that the preheat frequency $f_{PH}$ is approximately 150 kHz. The inverter control circuit 216 also comprises a preheat-time-set capacitor $C_{PH}$, which is coupled to a preheat-time-set input (pin 5) of the inverter control IC U300 for setting the length of the preheat time period $T_{PH}$. For example, the preheat-time-set capacitor $C_{PH}$ may have a capacitance of approximately 0.33 µF, such that the preheat time period $T_{PH}$ is approximately 700 msec.

During the preheat time period $T_{PH}$, a voltage $V_{RPH}$ generated across the preheat-frequency-set resistor $R_{PH}$ (i.e., at pin 7) is maintained constant, while a voltage $V_{CPH}$ generated across the preheat-time-set capacitor $C_{PH}$ (i.e., at pin 5) increases in magnitude with respect to time from approximately zero volts. When the voltage $V_{CPH}$ across the preheat-time-set capacitor $C_{PH}$ exceeds a preheat voltage threshold $V_{PH}$ at the end of the preheat time period $T_{PH}$, the inverter control IC U300 then controls the operating frequency $f_{OP}$ to attempt to strike the lamp tube 122. The voltage $V_{RPH}$ across the preheat-frequency-set resistor $R_{PH}$ and the voltage $V_{CPH}$ across the preheat-time-set capacitor $C_{PH}$ are also provided to the control circuit 230, such that the control circuit is operable to properly control the inverter control IC U300 during the preheat time period $T_{PH}$ as will be described in greater detail below.

The inverter control circuit 216 comprises an operating-frequency-set resistor $R_T$ coupled to an frequency-set-resistor input (pin 8) of the inverter control IC U300 and an operating-frequency-set capacitor $C_T$ coupled to a frequency-set-capacitor input (pin 6) for setting the operating frequency $f_{OP}$ of the square-wave voltage $V_{SQ}$ when the lamp tube 122 is illuminated (i.e., after the lamp tube has been struck). For example, the operating-frequency-set resistor $R_T$ may have a resistance of approximately 30 kΩ and the operating-frequency-set capacitor $C_T$ may have a capacitance of approximately 330 pF, such that a default operating frequency of the square-wave voltage $V_{SQ}$ is approximately 110 kHz.

The inverter control circuit 216 further comprises an NPN bipolar junction transistor Q310 having a collector-emitter junction coupled between the frequency-set-resistor input of the inverter control IC U300 and circuit common through a resistor R312 (e.g., having a resistance of approximately 10 kΩ). The base of the transistor Q310 is coupled to receive the drive control signal $V_{DR}$ from the control circuit 230. The drive control signal $V_{DR}$ has a DC magnitude that is representative of a target operating frequency $f_{TRGT}$ to which the operating frequency $f_{OP}$ should be controlled to control the intensity of the lamp tube 122 to the target intensity $L_{TRGT}$. The transistor Q310 is controlled to operate in the linear region, such that the transistor Q310 provides a controllable impedance between the frequency-set-resistor input of the inverter control IC U300 and circuit common in response to the DC magnitude of the drive control signal $V_{DR}$. Accordingly, the control circuit 230 is operable to adjust the operating frequency $f_{OP}$ of the square-wave voltage $V_{SQ}$ by controlling the impedance provided by the transistor Q310 and thus the current conducted through the frequency-set-resistor input of the inverter control IC U300.

The inverter control circuit 216 receives the OVP control signal $V_{OVP}$ from the OVP circuit 260. Specifically, the OVP control signal $V_{OVP}$ is coupled to an open lamp protection (OLP) input (pin 10) of the inverter control IC U300 through a resistor R320 (e.g., having a resistance of approximately 10 kΩ), and is coupled to circuit common through a capacitor C322 (e.g., having a capacitance of approximately 0.1 g). The OVP circuit 260 comprises a voltage divider having resistors R261, R262 for scaling the magnitude of the lamp voltage $V_{LAMP}$ down to a magnitude that is appropriate to be received by the inverter control IC U300. For example, the resistors R261, R262 may have resistances of approximately 1 MΩ and 25.5 kΩ, respectively. The junction of the resistors R261, R262 is coupled to a capacitor C264 (e.g., having a capacitance of approximately 0.1 µF) through a diode D265. The junction of the capacitor C264 and the diode D265 is coupled to the inverter control circuit 216 through a zener diode Z266 for generating the OVP control signal $V_{OVP}$, which is coupled to circuit common through a resistor R268 (e.g., having a resistance of approximately 100 kΩ). For example, the zener diode Z266 may have a break-over voltage of approximately 13.2 volts.

During normal operation, the voltage at the OLP input of the inverter control IC U300 remains low (i.e., at approximately circuit common). However, in the event of an overvoltage condition across the lamp tube 122, the zener diode Z266 begins to conduct, such that the voltage at the OLP input of the inverter control IC U300 increases in magnitude. When the magnitude of the voltage at the OLP input exceeds an OLP threshold voltage of the inverter control IC U300 (e.g., approximately 2 volts), the inverter control IC disables the outputs (i.e., pins 13 and 16) such that the FETs Q212, Q214 are rendered non-conductive and the lamp tube 122 is not illuminated until the control circuit 230 controls the inverter circuit 210 to attempt to restrike the lamp tube once again.

Figure 8:
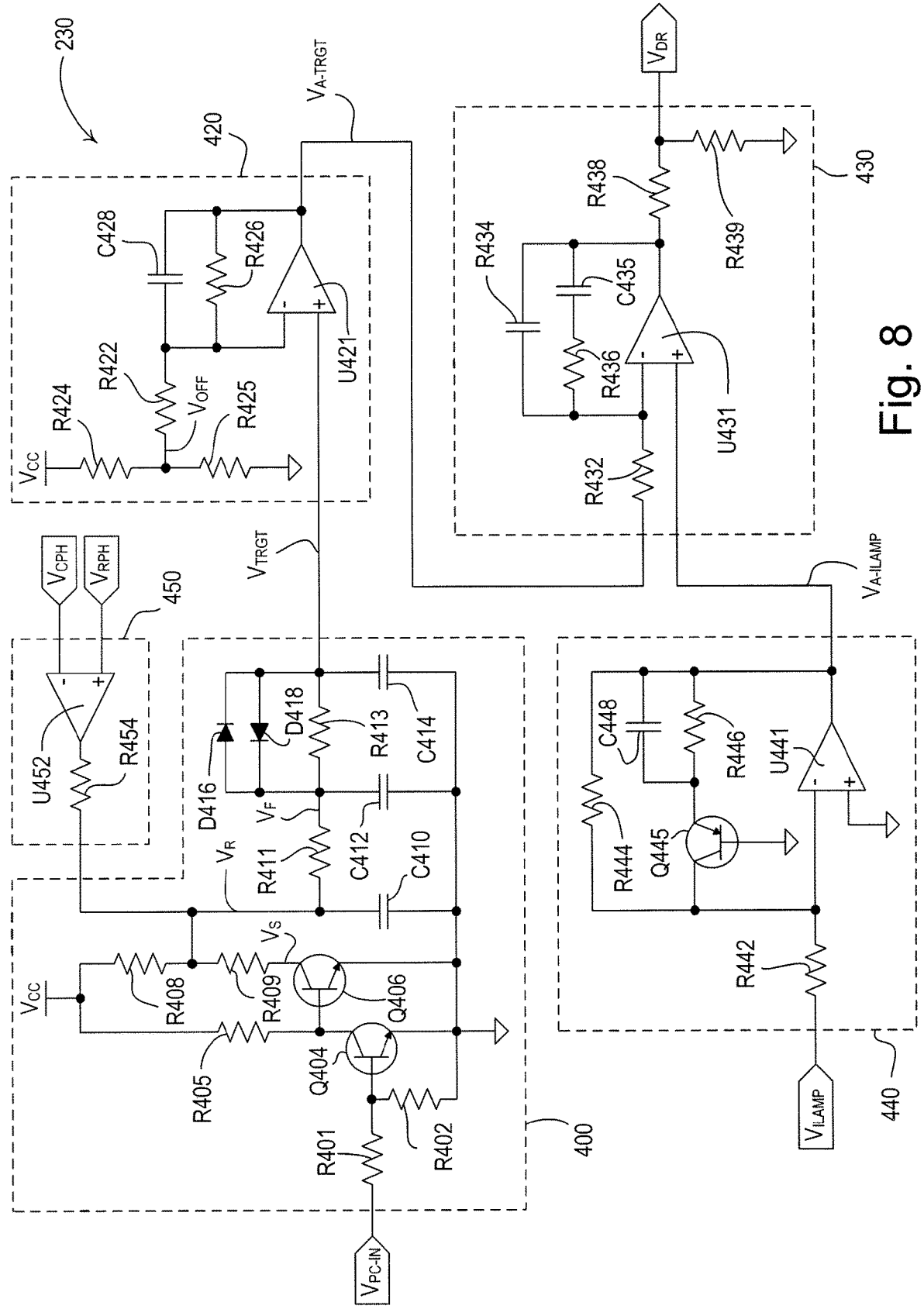
FIG. 8 is a simplified schematic diagram of a control circuit of the screw-in compact fluorescent lamp of FIG. 4.

FIG. 8 is a simplified schematic diagram of the control circuit 230. The control circuit 230 comprises a two-speed phase-to-DC converter circuit 400 for converting the phase-control input control signal $V_{PC-IN}$ to a DC target voltage $V_{TRGT}$ that is representative of the duty-cycle $DC_{PC}$ of the phase-control voltage $V_{PC}$ and thus the target intensity $L_{TRGT}$ of the lamp tube 122. The DC target voltage $V_{TRGT}$ is amplified by a non-inverting amplifier circuit 420 to generate an amplified target voltage $V_{A-TRGT}$, such that the magnitude of the amplified target voltage $V_{A-TRGT}$ is within a correct range to be received by an error amplifier circuit 430. For example, the DC target voltage $V_{TRGT}$ may be in the range of approximately 1-4 volts, while the amplified target voltage $V_{A-TRGT}$ is in the range of approximately 0.5-6.5 volts. A non-linear amplifier circuit 440 receives the lamp current control signal $V_{ILAMP}$ from the lamp current sense circuit 270 and generates an amplified lamp current signal $V_{A-ILAMP}$. The error amplifier circuit 430 receives the amplified target voltage $V_{A-TRGT}$ and the amplified lamp current signal $V_{T-ILAMP}$ and generates the drive control signal $V_{DR}$ to adjust the operating frequency $f_{OP}$ of the inverter circuit 210, so as to minimize the error between the amplified target voltage $V_{A-TRGT}$ and the amplified lamp current signal $V_{T-ILAMP}$.

The phase-to-DC converter circuit 400 comprises a voltage divider having two resistors R401, R402 for scaling down the phase-control input control signal $V_{PC-IN}$. For example, the resistors R401, R402 may have resistances of approximately 1 MΩ and 47 kΩ, respectively. Next, the phase-to-DC converter circuit 400 generates a switched voltage $V_S$ that has a duty-cycle approximately equal to the duty cycle $DC_{PC}$ of the phase-control input control signal $V_{PC-IN}$. Specifically, the junction of the resistors R401, R402 is coupled to the base of a first NPN bipolar junction transistor Q404 that has a collector-emitter junction coupled between the control supply voltage $V_{CC}$ and circuit common through a resistor R405 (e.g., having a resistance of approximately 220 kΩ). The junction of the collector of the transistor Q404 and the resistor R405 is coupled to the base of a second NPN bipolar junction transistor Q406 that has a collector-emitter junction coupled between the control supply voltage $V_{CC}$ and circuit common through two resistors R408, R409 (e.g., having resistances of approximately 40 kΩ and 1 kΩ, respectively). Accordingly, the switched voltage $V_S$ is generated at the collector of the second transistor Q406.

When the magnitude of the phase-control input control signal $V_{PC-IN}$ is approximately zero volts (i.e., when the bidirectional semiconductor switch 32 of the dimmer switch 30 is non-conductive), the first transistor Q404 is rendered non-conductive, such that the second transistor Q406 is rendered conductive and the switched voltage $V_S$ is pulled low towards circuit common. When the magnitude of the phase-control input control signal $V_{PC-IN}$ is greater than a phase-control threshold, e.g., approximately 15 volts (i.e., when the bidirectional semiconductor switch 32 of the dimmer switch 30 is conductive), the first transistor Q404 is rendered conductive, such that the second transistor Q406 is rendered non-conductive and the switched voltage $V_S$ is pulled high towards control supply voltage $V_{CC}$ through the resistors R408, R409.

A ramp voltage $V_R$ is generated across a capacitor C410 (e.g., having a capacitance of approximately 0.22 g) in response to the square-wave voltage $V_S$. When the second transistor Q406 is non-conductive, the capacitor C410 is able to charge towards the control supply voltage $V_{CC}$ through the resistor R408, such that the magnitude of the ramp voltage $V_R$ increases with respect to time while the switched voltage $V_S$ is high. When the second transistor Q406 is conductive, the capacitor C410 is able to discharge through the resistor R409, such that the magnitude of the ramp voltage $V_R$ decreases at a second rate that is much faster than the first rate at which the ramp voltage increases in magnitude. Accordingly, the ramp voltage $V_R$ is generated across the capacitor C410 and has a duty cycle equal to approximately the duty cycle of the phase-control input control signal $V_{PC-IN}$. Next, the ramp voltage $V_R$ is filtered by a first filter circuit, e.g., a resistor-capacitor (RC) circuit (including a resistor R411 and a capacitor C412), to generate a filtered voltage $V_F$. For example, the resistor R411 has a resistance of approximately 220 kΩ and the capacitor C412 has a capacitance of approximately 0.22 µF, such that the first RC circuit has a time constant $\tau_{RC1}$ of approximately 48.4 msec.

The filtered voltage $V_F$ from the first RC circuit is then filtered by a second RC circuit (having a resistor R413 and a capacitor C414) to generate the target voltage $V_{TRGT}$. Two diodes D416, D418 are coupled in anti-parallel connection across the resistor R413. For example, the resistor R413 has a resistance of approximately 2.2 MΩ and the capacitor C414 has a capacitance of approximately 0.22 µF, such that a time constant $\tau_{RC2}$ of the second RC circuit has a nominal value of approximately 484 msec (i.e., approximately 10 times slower than the first RC circuit). The magnitude of the target voltage $V_{TRGT}$ is a function of the square of the conduction time $T_{CON}$ of the bidirectional semiconductor switch 32 of the dimmer switch 30, i.e., $V_{TRGT}=f(T_{CON}^2)$. Accordingly, the control circuit 230 is operable to adjust the intensity of the lamp tube 122 in response to the duty-cycle $DC_{PC}$ of the phase-control voltage $V_{PC}$ according to a "square-law" dimming curve. As a result, the control circuit 230 provides finer tuning of the intensity of the lamp tube 122 near the low-end intensity $L_{LE}$, such that larger variations in the conduction time $T_{CON}$ of the bidirectional semiconductor switch 32 result in smaller changes in the intensity of the lamp tube 122 near the low-end intensity $L_{LE}$.

Voltage fluctuations in the AC mains line voltage $V_{AC}$ of the AC power source 15 or noise on the AC mains line voltage $V_{AC}$ can cause the duty-cycle $DC_{PC}$ of the phase-control signal $V_{PC}$ and the magnitude of the filtered voltage $V_F$ to vary slightly. Therefore, the slow nominal value $\tau_{RC2-NOM}$ of the time constant $\tau_{RC2}$ of the second RC circuit provides enough filtering such that the target voltage $V_{TRGT}$ is not responsive to changes in the filtered voltage $V_F$ that are less than a predetermined threshold, e.g., approximately the forward voltage of the diodes D416, D418, i.e., a diode drop (e.g., approximately 0.7 volts).

However, changes in the target intensity $L_{TRGT}$ at the dimmer switch 30 that result in the dimmer switch changing the duty cycle $DC_{PC}$ of the phase-control signal $V_{PC}$ cause the magnitude of the filtered voltage $V_F$ to change by greater amounts and at faster rates than the voltage fluctuations and noise of the AC mains line voltage $V_{AC}$. Therefore, when the magnitude of the filtered voltage $V_F$ changes by more than the forward voltage of the diodes D416, D418, one of the diodes D416, D418 will begin to conduct such that the magnitude of the target voltage $V_{TRGT}$ across the capacitor C414 changes quickly in response to changes in the target intensity $L_{TRGT}$. Specifically, the first diode D416 is operable to conduct current into the capacitor C414 when the target intensity $L_{TRGT}$ increases, such that the time constant $\tau_{RC2}$ has a fast value $\tau_{RC2-FAST}$ that is less than the nominal value $\tau_{RC2-NOM}$. In addition, the capacitor C414 is operable to discharge through the diode D418 with the fast value $\tau_{RC2\text{-}FAST}$ when the target intensity $L_{TRGT}$ decreases. Accordingly, the two-speed phase-to-DC converter circuit 400 is able to filter out changes in the duty cycle $DC_{PC}$ of the phase-control voltage $V_{PC}$ due to voltage fluctuations and noise of the AC mains line voltage $V_{AC}$ while still providing a fast response as a result of changes in the target intensity $L_{TRGT}$.

Each of the diodes D416, D418 stops conducting when the difference between the magnitudes of the target voltage $V_{TRGT}$ and the filtered voltage $V_F$ falls below approximately the forward voltage of the respective diode. After the diodes D416, D418 stop conducting, the magnitude of the target intensity $L_{TRGT}$ will slowly change to be equal to the magnitude of the filtered voltage $V_F$ (according to the nominal time constant $\tau_{RC2\text{-}NOM}$) until the magnitudes of the voltages are equal. This results in a slow fading of the intensity of the lamp tube 122 at the end of a change in the target intensity $L_{TRG}$, which provides a pleasant, soft effect on a human eye that is observing the change in the intensity of the lamp tube.

The non-inverting amplifier circuit 420 comprises an operational amplifier ("op amp") U421, such as, for example, part number LM2902PWR, manufactured by National Semiconductor Corporation. The target voltage $V_{TRGT}$ is coupled to the non-inverting input of the op amp U421, while an offset voltage $V_{OFF}$ is coupled to the inverting input of the op amp through a resistor R422 (e.g., having a resistance of approximately 160 kΩ). The offset voltage $V_{OFF}$ is generated by a voltage divider that is coupled between the control supply voltage $V_{CC}$ and circuit common, and includes two resistors R424, R425. For example, the resistors R424, R425 may have resistances of approximately 33 kΩ and 5 kΩ, respectively, such that the offset voltage $V_{OFF}$ has a magnitude of approximately 2 volts. The output of the op amp U421 is coupled the inverting input via the parallel combination of a resistor R426 (e.g., having a resistance of approximately 150 kΩ) and a capacitor C428 (e.g., having a capacitance of approximately 0.22 g). The magnitude of the amplified target voltage $V_{A\text{-}TRGT}$ ranges from approximately 0.5 to 6.5 volts as the magnitude of the target voltage $V_{TRGT}$ ranges from approximately 1 to 4 volts.

The non-linear amplifier circuit 440 receives the lamp current control signal $V_{ILAMP}$ from the lamp current sense circuit 270, which is shown in FIG. 6. The lamp current control signal $V_{ILAMP}$ is generated across the parallel combination of a resistor R272 (e.g., having a resistance of approximately 4Ω) and a capacitor C274 (e.g., having a capacitance of approximately 2.2 g). During the negative half-cycles of the lamp current $I_{LAMP}$, the lamp current is conducted through a diode D276 and the parallel combination of the resistor R272 and the capacitor C274. During the positive half-cycles of the lamp current $I_{LAMP}$, the lamp current is conducted through a diode D278 and is not conducted through the parallel combination of the resistor R272 and the capacitor C274. Accordingly, the lamp current control signal $V_{ILAMP}$ has a negative magnitude that is representative of the magnitude of the lamp current $I_{LAMP}$ during the negative half-cycles of the lamp current. Since the resistor R272 only conducts the lamp current $I_{LAMP}$ every other half-cycle, the resistor R272 dissipates half of the amount of power that would be dissipated if the resistor R272 conducted the lamp current each half-cycle.

Referring back to FIG. 8, the non-linear amplifier circuit 440 comprises an op amp U441 having a non-inverting input coupled to circuit common and an inverting input coupled to receive the lamp current control signal $V_{ILAMP}$ through a resistor R442 (e.g., having a resistance of approximately 1 kΩ). The output of the op amp U441 is coupled to the inverting input through a resistor R444 (e.g., having a resistance of approximately 68.1 kΩ). The non-linear amplifier circuit 440 further comprises a PNP bipolar junction transistor Q445 and a resistor R446 (e.g., having a resistance of approximately 27 kΩ). The series combination of the collector-emitter junction of the transistor Q445 and the resistor R446 is also coupled between the inverting input and the output of the op amp U441. A capacitor C448 is coupled is parallel with the resistor R446 and may have, for example, a capacitance of approximately 470 pF.

When the magnitude of the lamp current LAMP is less than a current threshold (e.g., approximately 100 mA), the magnitude of the amplified lamp current signal $V_{A\text{-}ILAMP}$ is less than approximately the rated emitter-base voltage of the transistor Q445. At this time, only the resistor R444 is coupled between the inverting input and the output of the op amp U441, such that the non-linear amplifier circuit 440 is characterized by a first gain $\alpha_1$ (e.g., approximately −68). However, when the magnitude of the lamp current LAMP is greater than the current threshold, the transistor Q445 is rendered conductive, such that the resistor R446 is coupled in parallel with the resistor R444 between the inverting input and the output of the op amp U441. Accordingly, above the current threshold, the non-linear amplifier circuit 440 is characterized by a second gain $\alpha_2$ that has a smaller magnitude than the first gain $\alpha_1$ (e.g., approximately −25).

The error amplifier circuit 430 comprises an op amp U431 having a non-inverting input coupled to receive the amplified lamp current signal $V_{A\text{-}LAMP}$ and an inverting input coupled to receive the amplified target voltage $V_{A\text{-}TRGT}$ through a resistor R432 (e.g., having a resistance of approximately 30 kΩ). The error amplifier circuit 430 further comprises two capacitors C434, C435 (e.g., each having a capacitance of approximately 4.7 nF) and a resistor R436 (e.g., having a resistance of approximately 47 kΩ). The capacitor C434 is coupled between the inverting input and the output of the op amp U431, while the series combination of the capacitor C435 and the resistor R436 is also coupled between the inverting input and the output of the op amp U431. The output of the op amp U431 is coupled to circuit common through a resister divider having two resistors R438, R439 (e.g., having resistances of 18.7 kΩ and 6.8 kΩ, respectively), where the drive control signal $V_{DR}$ is produced at the junction of the resistors R438, R439. The error amplifier circuit 430 operates to adjust the operating frequency $f_{OP}$ of the inverter circuit 210 so as to minimize the error (i.e., the difference) between the amplified lamp current signal $V_{A\text{-}ILAMP}$ and the amplified target voltage $V_{A\text{-}TRGT}$. For example, the error amplifier circuit 430 may be characterized by a cutoff frequency of greater than or equal to approximately 10 kHz (i.e., the control circuit 230 has a bandwidth greater than or equal to approximately 10 kHz).

As previously mentioned, the lamp tube 122 of the screw-in compact fluorescent lamp 120 of the first embodiment of the present invention may be filled with the fill-gas mixture having a fill-gas pressure of approximately 2 Torr and a fill-gas ratio of approximately 85:15 argon to neon. FIG. 9 is an example V-I curve 500 (i.e., the plot of the magnitude of the lamp voltage $V_{LAMP}$ across the lamp tube 122 with respect to the magnitude of the lamp current $I_{LAMP}$ conducted through the lamp tube) according to the first embodiment of the present invention. FIG. 9 also shows an example V-I curve 550 of the prior art screw-in compact fluorescent lamp 20 that has a fill gas of 100% argon at a pressure of approximately 4 Torr.

By combining the lamp tube 122 having the fill-gas mixture having a fill-gas ratio of approximately 85:15 argon to neon at a pressure of approximately 2 Torr and the error amplifier 430 having a cutoff frequency of approximately 10 kHz, the V-I curve 500 of the screw-in compact fluorescent lamp 120 of the first embodiment of the present invention is much "flatter" than the V-I curve 550 of the prior art screw-in compact fluorescent lamp 20 as shown in FIG. 9. In other words, the magnitude of the lamp voltage $V_{LAMP}$ does not changes as much with respect to the magnitude of the lamp current LAMP as in the prior art screw-in compact fluorescent lamp 20. Therefore, the size of the components of the resonant tank circuit 220 may be smaller and the resonant tank circuit may operate more efficiently during normal operation. Since the filament windings 229A, 229B are magnetically coupled to the resonant inductor L222, the flatter V-I curve 500 of the screw-in compact fluorescent lamp 120 of the first embodiment of the present invention provides for more favorable magnitudes of the filament voltages across the dimming range of the lamp tube 122, particularly, near the near the low-end intensity $L_{LE}$ when the magnitude of the lamp voltage $V_{LAMP}$ begins to decrease as the magnitude of the lamp current $I_{LAMP}$ decreases.

Figure 10A:
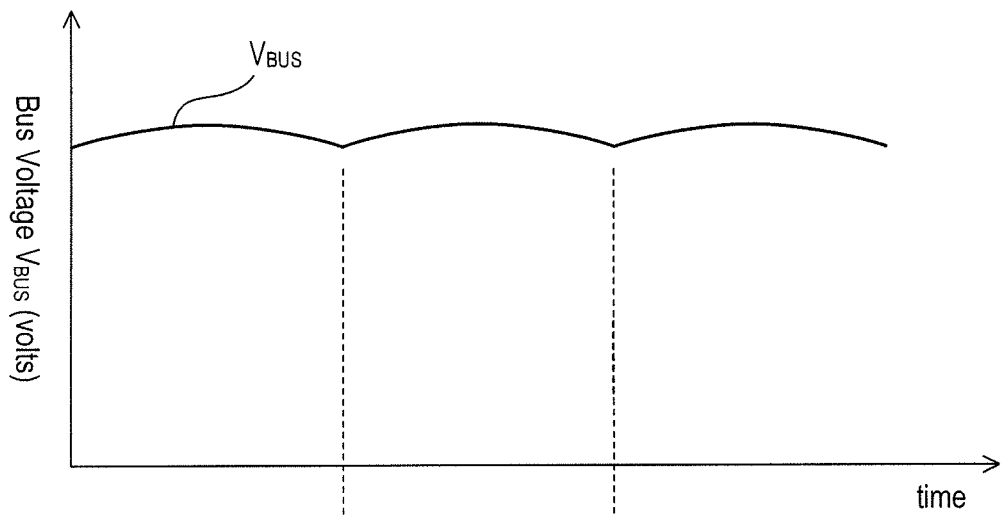
FIG. 10A shows an example waveform of a bus voltage of the screw-in compact fluorescent lamp of FIG. 4.
Figure 10B:
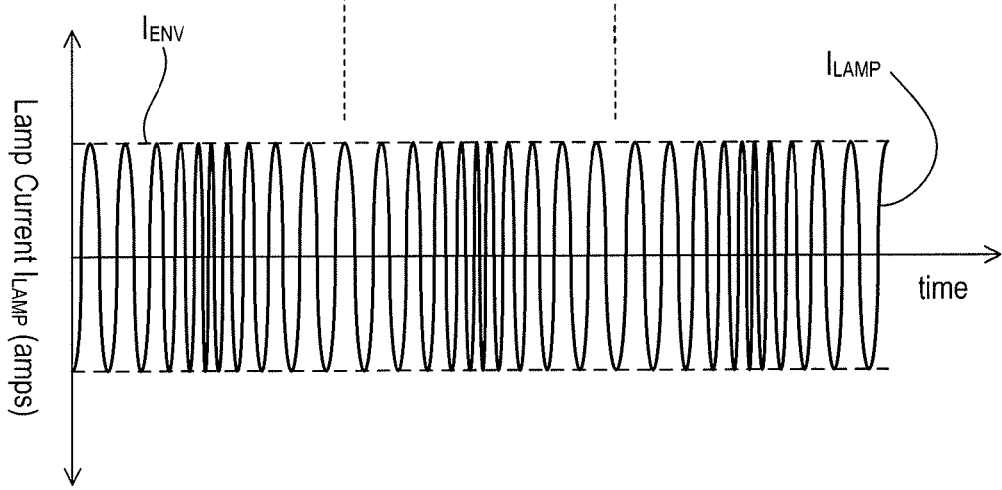
FIG. 10B shows an example waveform of a lamp current of the screw-in compact fluorescent lamp of FIG. 4 according to the first embodiment of the present invention.

FIGS. 10A and 10B show example waveforms of the DC bus voltage $V_{BUS}$ and the lamp current $I_{LAMP}$, respectively, of the screw-in compact fluorescent lamp 120 of the first embodiment of the present invention. Since the cutoff frequency of the error amplifier circuit 430 (i.e., approximately 10 kHz) is much greater than the frequency of the voltage ripple of the bus voltage $V_{BUS}$ (i.e., approximately 120 Hz), the control circuit 230 is able to adjust the operating frequency $f_{OP}$ of the square-wave voltage $V_{SQ}$ (and thus the lamp current $I_{LAMP}$) within a single half-cycle of the AC power source 15. Therefore, the operating frequency $f_{OP}$ changes in magnitude in response to the voltage ripple of the bus voltage $V_{BUS}$ during each half-cycle and the lamp current $I_{LAMP}$ has an envelope $I_{ENV}$ that is relatively constant or flat (as shown in FIG. 10B). It has been observed that this high speed operation of the error amplifier circuit 430 reduces flickering in the lamp tube 122, particularly when the lamp tube is cold and/or has just been started up. In addition, since the operating frequency $f_{OP}$ of the inverter circuit 210 changes during each half-cycle even when the screw-in compact fluorescent lamp 120 is maintaining the target intensity $L_{TRGT}$ of the lamp tube 122 constant, the compact fluorescent lamp does not generate EMI noise at specific frequencies, but spreads the frequency of the EMI noise out over a range, such that the peak magnitude of the noise is decreased.

Referring back to FIG. 8, the control circuit 230 further comprises a preheat adjustment circuit 450 that modifies the operation of the phase-to-DC converter circuit 400 while the load regulation circuit 130 is preheating the filaments 228A, 228B of the lamp tube 122 (i.e., during the preheat time period $T_{PH}$). The preheat adjustment circuit 450 comprises an op amp U452 having a non-inverting input coupled to receive the voltage $V_{RPH}$ across the preheat-frequency-set resistor $R_{PH}$ of the inverter control circuit 216, and an inverting input coupled to receive the voltage $V_{CPH}$ across the preheat-time-set capacitor $C_{PH}$ The output of the op amp U452 is coupled to the capacitor C410 of the phase-to-DC converter circuit 400 through a resistor R454 (e.g., having a resistance of approximately 464 kΩ). As previously mentioned, while the inverter control IC U300 is preheating the filaments 228A, 228B of the lamp tube 122, the voltage $V_{RPH}$ across the preheat-frequency-set resistor $R_{PH}$ is maintained constant, while the voltage $V_{CPH}$ across the preheat-time-set capacitor $C_{PH}$ increases in magnitude with respect to time from approximately zero volts. During the preheat time period $T_{PH}$, the op amp U452 injects current into the capacitor C410 of the phase-to-DC converter circuit 400, such that the magnitude of the target voltage $V_{TRGT}$ increases. Therefore, if the lamp tube 122 is being turned on to an intensity near the low-end intensity $L_{LE}$, the magnitude of the lamp current $I_{LAMP}$ will be large enough at the end of the preheat time period $T_{PH}$ to ensure that the arc current is established in the lamp tube when the lamp tube is struck. After the arc current has been properly established in the lamp tube 122, the op amp U452 stops injecting current into the capacitor C410 of the phase-to-DC converter circuit 400 and the intensity of the lamp tube is controlled in response to the target intensity $L_{TRGT}$ determined from the duty-cycle $DC_{PC}$ of the phase-control voltage $V_{PC}$.

Figure 11:
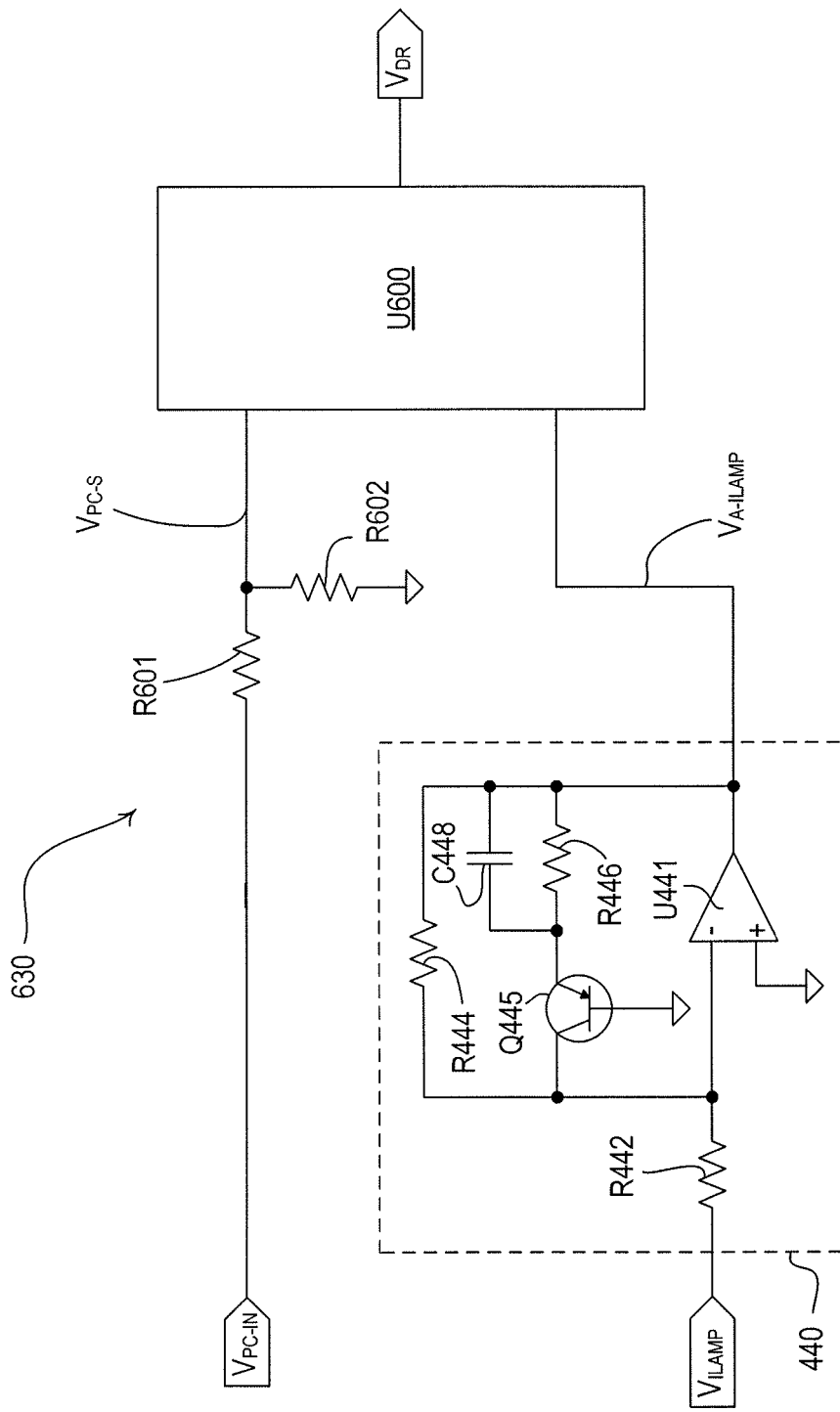
FIG. 11 is a simplified schematic diagram of a control circuit of the dimmable screw-in compact fluorescent lamp according to a second embodiment of the present invention.

FIG. 11 is a simplified schematic diagram of a control circuit 630 of the dimmable screw-in compact fluorescent lamp 120 according to a second embodiment of the present invention. The control circuit 630 comprises a microprocessor U600 that implements the functions of the control circuit 330 of the first embodiment that were executed by the two-speed phase-to-DC converter circuit 400, the non-inverting amplifier circuit 420, and the error amplifier circuit 430. The control circuit 630 comprises a resistive divider including two resistors R601, R602 for scaling the phase-control input control signal $V_{PC-IN}$ to generate a scaled phase-control input control signal $V_{PC-S}$. The microprocessor U600 receives the scaled phase-control input control signal $V_{PC-S}$ and the amplified target voltage $V_{A-TRGT}$ from the non-linear amplifier circuit 440. The microprocessor U600 generates a drive control signal $V_{DR}$ to control the intensity level of the lamp tube 122 to a target intensity level $L_{TRGT}$. Alternatively, the microprocessor U600 may be implemented as a microcontroller, a programmable logic device (PLD), an application specific integrated circuit (ASIC), a field-programmable gate array (FPGA), or any suitable controller or processing device.

Figure 12:
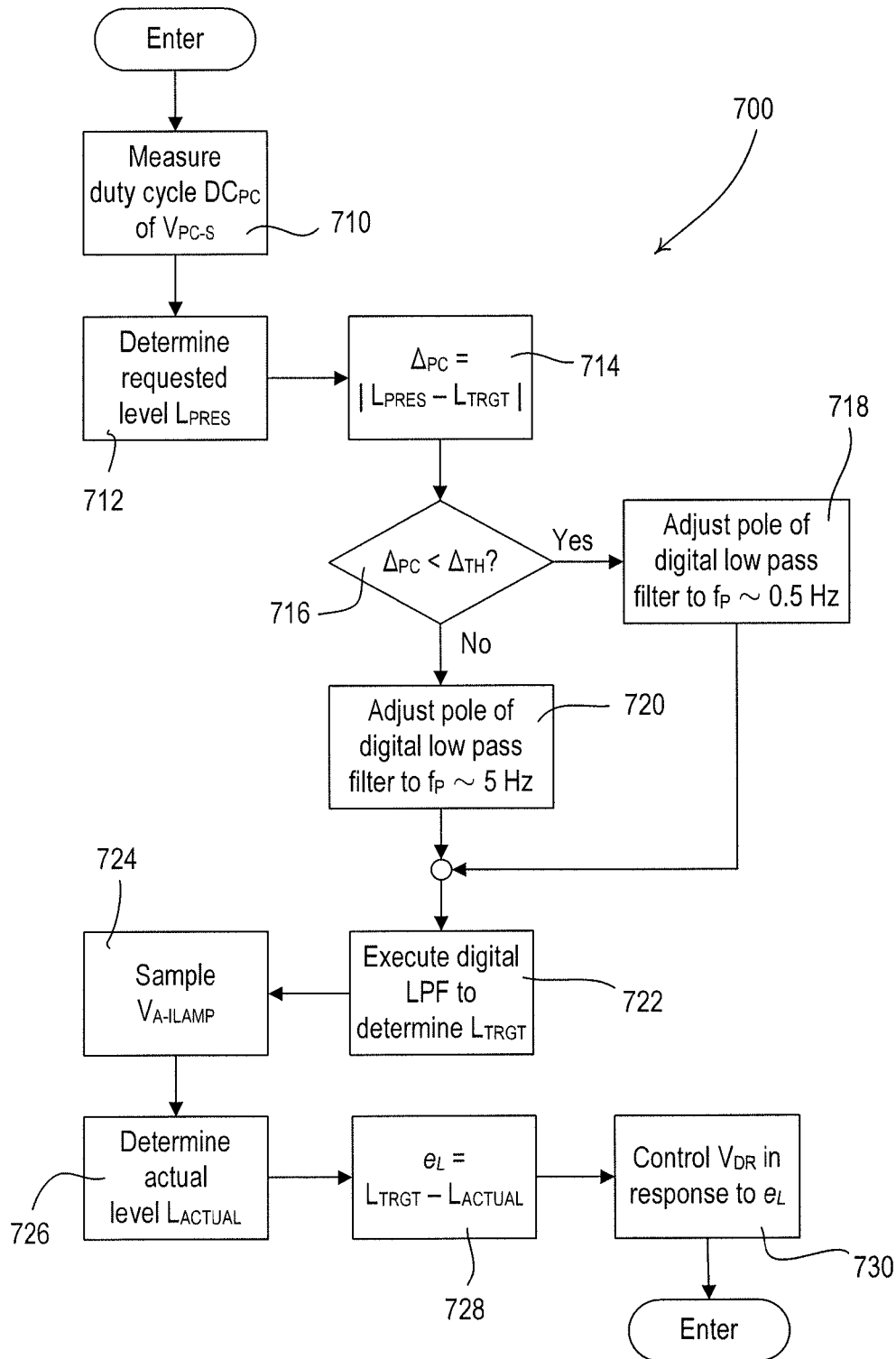
FIG. 12 is a simplified flowchart of a control procedure executed periodically by a microprocessor of the control circuit of FIG. 11.

FIG. 12 is a simplified flowchart of a control procedure 700 executed periodically by the microprocessor U600, e.g., once every half-cycle of the AC power source 15. The microprocessor U600 first measures the duty cycle $V_{PC}$ of the scaled phase-control input control signal $V_{PC-S}$ at step 710, and then determines a requested intensity level $L_{PRES}$ from the duty cycle $V_{PC}$ of the scaled phase-control input control signal $V_{PC-S}$ at step 712. The microprocessor U600 then determines a phase-control input change value $\Delta_{PC}$, i.e., the absolute value of the difference between the new requested intensity level $L_{PRES}$ and the present target intensity level $L_{TRGT}$ from the last sample, at step 714.

The microprocessor U600 uses a digital low-pass filter (LPF) to process the values of the requested intensity level $L_{PRES}$. If the phase-control input change value $\Delta_{PC}$ is less than a phase-control input change threshold $\Delta_{TH}$ at step 716, the microprocessor U600 adjusts the pole of the digital low-pass filter such that the passband frequency $f_P$ of the filter is a first predetermined frequency (e.g., approximately 0.5 Hz) at step 718. If the phase-control input change value $\Delta_{PC}$ is not less than the phase-control input change threshold $\Delta_{TH}$ at step 716, the microprocessor U600 adjusts the pole of the digital low-pass filter so that the passband frequency $f_P$ of the filter is a second predetermined frequency (e.g., approximately 5 Hz) at step 720. Accordingly, when the duty-cycle $DC_{PC}$ of the phase-control signal $V_{PC}$ is remaining relatively constant (i.e., when the phase-control input change value $\Delta_{PC}$ is less than the phase-control input change threshold $\Delta_{TH}$), the requested intensity level $L_{PRES}$ is more heavily filtered, and the target intensity level $L_{TRGT}$ is adjusted with a slow time constant $\tau_{DLPF\text{-}SLOW}$. When the duty cycle $DC_{PC}$ is changing rapidly, the requested intensity level $L_{PRES}$ is filtered less, and the target intensity level $L_{TRGT}$ is adjusted with a fast time constant $\tau_{DLPF\text{-}FAST}$. For example, the phase-control input change threshold $\Delta_{TH}$ may be equal to the target intensity level $L_{TRGT}$ divided by ten, such that the microprocessor U600 adjusts the target intensity level $L_{TRGT}$ using the fast time constant $\tau_{DLPF\text{-}FAST}$ when there is greater than or equal to a 10% change in the target intensity level $L_{TRGT}$.

After adjusting the passband frequency $f_P$ of the digital low-pass filter at steps 718, 720, the microprocessor U600 processes the requested intensity level $L_{PRES}$ through the digital low-pass filter at step 722 to determine the target intensity level $L_{TRGT}$ to which the microprocessor will now control the intensity level of the lamp tube 122. The microprocessor U600 then samples the amplified lamp current signal $V_{A\text{-}ILAMP}$ at step 724, and determines an actual intensity level $L_{ACTUAL}$ from the sampled values of the amplified lamp current signal $V_{A\text{-}ILAMP}$ at step 726. The microprocessor U600 then determines an error $e_L$ between the target intensity level $L_{TRGT}$ and the actual intensity level $L_{ACTUAL}$ at step 728 and controls the drive control signal $V_{DR}$ in response to the error $e_L$ to adjust the lighting intensity of the lamp tube 122 towards the target intensity level $L_{TRGT}$ at step 730 before the control procedure 700 exits.

While the present invention has been described with reference to the screw-in compact fluorescent lamp 120, the concepts of the present invention could be used in lighting control systems having a ballast circuit that is separate from the controlled fluorescent lamps, for example, mounted to a junction box next to a lighting fixture in which the lamps are installed. In addition, the circuits and methods of determining the target intensity level $L_{TRGT}$ in response to the duty cycle $DC_{PC}$ of the phase-control signal $V_{PC}$ could be used in another type of load control device, such as, for example, a light-emitting diode (LED) driver for driving an LED light source (i.e., an LED light engine); a screw-in luminaire including a dimmer circuit and an incandescent or halogen lamp; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads; and a motor control unit for controlling a motor load, such as a ceiling fan or an exhaust fan.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lamp controller comprising:
    a control circuit to:
    receive phase-controlled AC voltage ($V_{PC\text{-}IN}$) from an electrical load control device;
    generate, via phase-control-to-DC converter circuitry, a target voltage ($V_{TRGT}$) using the received phase-controlled AC voltage ($V_{PC\text{-}IN}$);
    amplify the determined target voltage to provide an amplified target voltage ($V_{A\text{-}TRGT}$);
    receive a lamp current control signal ($V_{ILAMP}$) from a lamp current sense circuit operatively coupled to a lamp;
    amplify the received lamp current control signal to provide an amplified lamp current signal ($V_{A\text{-}ILAMP}$); and
    combine the amplified target voltage and the amplified lamp current signal to provide a drive signal to adjust one or more operating parameters of a driver circuit operatively coupled to the lamp.

2. The lamp controller of claim 1 wherein to generate the target voltage using the received phase-controlled AC voltage, the control circuit to further:
    receive, by first filter circuitry, the phase-controlled AC voltage;
    generate, via the first filter circuitry, a first filtered voltage using a first time constant;
    receive, by second filter circuitry, the first filtered voltage; and
    generate, via the second filter circuitry, the target voltage using a second time constant that is slower than the first time constant.

3. The lamp controller of claim 2 wherein to generate the target voltage using the received phase-controlled AC voltage, the control circuit to further:
    calculate an error value as the absolute value of a calculated difference between the target voltage and the first filtered voltage;
    determine whether the error value exceeds a defined target threshold value; and
    responsive to the determination that the error value exceeds the defined target threshold value, generate, via the second filter circuitry, the target voltage using a third time constant that is faster than the first time constant.

4. The lamp controller of claim 1 wherein to amplify the determined target voltage to provide an amplified target voltage, the control circuitry to further:
    amplify the determined target voltage using a non-inverting amplifier circuit.

5. The lamp controller of claim 1 wherein to combine the amplified target voltage and the amplified lamp current signal to provide the drive signal, the control circuitry to:
    provide the amplified lamp current to a non-inverting input of an operational amplifier; and
    provide the amplified target voltage through a resistance to the inverting input of the operational amplifier.

6. A lamp control method comprising:
    receiving, by a lamp control circuit, phase-controlled AC voltage ($V_{PC\text{-}IN}$) from an electrical load control device;
    generating, by the lamp control circuit via phase-control-to-DC converter circuitry, a target voltage ($V_{TRGT}$) using the received phase-controlled AC voltage ($V_{PC\text{-}IN}$);
    amplifying, by the lamp control circuit, the determined target voltage to provide an amplified target voltage ($V_{A\text{-}TRGT}$);
    receiving, by the lamp control circuit, a lamp current control signal ($V_{ILAMP}$) from a lamp current sense circuit operatively coupled to a lamp;
    amplifying, by the lamp control circuit, the received lamp current control signal to provide an amplified lamp current signal ($V_{A\text{-}ILAMP}$); and
    combining, by the lamp control circuit, the amplified target voltage with the amplified lamp current signal to provide a drive signal to adjust one or more operating parameters of a driver circuit operatively coupled to the lamp.

7. The method of claim 6, wherein generating the target voltage using the received phase-controlled AC voltage further comprises:
   receiving, by first filter circuitry included in the lamp control circuit, the phase-controlled AC voltage;
   generating, via the first filter circuitry, a first filtered voltage using a first time constant;
   receiving, by second filter circuitry included in the lamp control circuit, the first filtered voltage; and
   generating, via the second filter circuitry, the target voltage using a second time constant that is slower than the first time constant.

8. The method of claim 7 generating the target voltage using the received phase-controlled AC voltage further comprises:
   calculating, by the lamp control circuit, an error value as the absolute value of a difference between the target voltage and the first filtered voltage;
   determining, by the lamp control circuit, whether the error value exceeds a defined target threshold value; and
   responsive to the determination that the error value exceeds the defined target threshold value, generating, by the second filter circuitry, the target voltage using a third time constant that is faster than the first time constant.

9. The method of claim 6 wherein amplifying the determined target voltage to provide an amplified target voltage, the control circuitry to further:
   amplifying, by the lamp control circuit, the determined target voltage using a non-inverting amplifier circuit included in the lamp control circuit.

10. The method of claim 6 wherein combining the amplified target voltage with the amplified lamp current signal to provide the drive signal, the control circuitry to:
    providing, by the lamp control circuit, the amplified lamp current to a non-inverting input of an operational amplifier; and
    providing, by the lamp control circuit, the amplified target voltage through a resistance to the inverting input of the operational amplifier.

11. A non-transitory, machine-readable, storage device that includes instructions that, when executed by a lamp control circuit, causes the lamp control circuit to:
    receive a phase-controlled AC voltage ($V_{PC-IN}$) from an electrical load control device;
    generate, via phase-control-to-DC converter circuitry, a target voltage ($V_{TRGT}$) using the received phase-controlled AC voltage ($V_{PC-IN}$);
    amplify the determined target voltage to provide an amplified target voltage ($V_{A-TRGT}$);
    receive a lamp current control signal ($V_{ILAMP}$) from a lamp current sense circuit operatively coupled to a lamp;
    amplify the received lamp current control signal to provide an amplified lamp current signal ($V_{A-ILAMP}$); and
    combine the amplified target voltage with the amplified lamp current signal to provide a drive signal to adjust one or more operating parameters of a driver circuit operatively coupled to the lamp.

12. The non-transitory, machine-readable, storage device of claim 11, wherein the instructions that cause the control circuit to generate the target voltage using the received phase-controlled AC voltage further cause the control circuit to:
    receive, by first filter circuitry included in the lamp control circuit, the phase-controlled AC voltage;
    generate, via the first filter circuitry, a first filtered voltage using a first time constant;
    receive, by second filter circuitry included in the lamp control circuit, the first filtered voltage; and
    generate, via the second filter circuitry, the target voltage using a second time constant that is slower than the first time constant.

13. The non-transitory, machine-readable, storage device of claim 12, wherein the instructions that cause the control circuit to generate the target voltage using the received phase-controlled AC voltage further cause the control circuit to:
    calculate an error value as the absolute value of a difference between the target voltage and the first filtered voltage;
    determine whether the error value exceeds a defined target threshold value; and
    responsive to the determination that the error value exceeds the defined target threshold value, generate, via the second filter circuitry, the target voltage using a third time constant that is faster than the first time constant.

14. The non-transitory, machine-readable, storage device of claim 11, wherein the instructions that cause the control circuit to amplify the determined target voltage to provide an amplified target voltage, further cause the control circuit to:
    amplify the determined target voltage using a non-inverting amplifier circuit included in the lamp control circuit.

15. The non-transitory, machine-readable, storage device of claim 12, wherein the instructions that cause the control circuit to amplify target voltage with the amplified lamp current signal to provide the drive signal further cause the control circuit to:
    provide the amplified lamp current to a non-inverting input of an operational amplifier; and
    provide the amplified target voltage through a resistance to the inverting input of the operational amplifier.

* * * * *